(12) United States Patent
Ladpli et al.

(10) Patent No.: US 11,527,783 B2
(45) Date of Patent: Dec. 13, 2022

(54) BATTERY STATE MONITORING USING ULTRASONIC GUIDED WAVES

(71) Applicant: THE BOARD OF TRUSTEES OF THE LELAND STANFORD JUNIOR UNIVERSITY, Stanford, CA (US)

(72) Inventors: Purim Ladpli, Stanford, CA (US); Fu-Kuo Chang, Stanford, CA (US)

(73) Assignee: The Board of Trustees of the Leland Standford Junior University, Stanford, CA (US)

(*) Notice: Subject to any disclaimer, the term of this patent is extended or adjusted under 35 U.S.C. 154(b) by 115 days.

(21) Appl. No.: 16/312,241

(22) PCT Filed: Jun. 21, 2017

(86) PCT No.: PCT/US2017/038576
§ 371 (c)(1),
(2) Date: Dec. 20, 2018

(87) PCT Pub. No.: WO2017/223219
PCT Pub. Date: Dec. 28, 2017

(65) Prior Publication Data
US 2019/0207274 A1    Jul. 4, 2019

Related U.S. Application Data

(60) Provisional application No. 62/352,655, filed on Jun. 21, 2016.

(51) Int. Cl.
*H01M 10/48*    (2006.01)
*G01N 29/07*    (2006.01)
(Continued)

(52) U.S. Cl.
CPC ............ *H01M 10/48* (2013.01); *G01N 29/07* (2013.01); *G01N 29/11* (2013.01);
(Continued)

(58) Field of Classification Search
None
See application file for complete search history.

(56) References Cited

U.S. PATENT DOCUMENTS

| | | |
|---|---|---|
| 6,520,018 B1 | 2/2003 | Flores-Lira |
| 2008/0028860 A1 | 2/2008 | Refko et al. |

(Continued)

FOREIGN PATENT DOCUMENTS

| | | |
|---|---|---|
| CN | 103096808 A | 5/2013 |
| WO | WO-2013-096409 A2 | 6/2013 |
| WO | WO-2015-023820 A2 | 2/2015 |

OTHER PUBLICATIONS

Extended European Search Report on EP Application No. 17816150.1 dated Jan. 28, 2020, 8 pages.
Guemes, "SHM Technologies and Applications in Aircraft Structures," 5th International Symposium on NDT in Aerospace, Nov. 13-15, 2013, Singapore, 8 pages.
(Continued)

*Primary Examiner* — Haroon S. Sheikh
(74) *Attorney, Agent, or Firm* — Foley & Lardner LLP

(57) ABSTRACT

A method of battery state monitoring includes: (1) providing a battery cell and at least one ultrasonic actuator and at least one ultrasonic sensor mounted to the battery cell; (2) using the ultrasonic actuator, generating a guided wave that propagates in-plane of the battery cell; (3) using the ultrasonic sensor, receiving an arriving wave corresponding to the guided wave; and (4) determining a state of the battery cell based on the arriving wave.

19 Claims, 13 Drawing Sheets

(51) Int. Cl.
*G01N 29/11* (2006.01)
*G01N 29/44* (2006.01)
*G01N 29/46* (2006.01)
*H01M 10/42* (2006.01)

(52) U.S. Cl.
CPC ......... *G01N 29/4436* (2013.01); *G01N 29/46* (2013.01); *H01M 10/425* (2013.01); *G01N 2291/011* (2013.01); *G01N 2291/015* (2013.01); *G01N 2291/0258* (2013.01); *G01N 2291/0425* (2013.01); *G01N 2291/102* (2013.01); *G01N 2291/2697* (2013.01); *H01M 2010/4271* (2013.01); *H01M 2010/4278* (2013.01)

(56) References Cited

U.S. PATENT DOCUMENTS

| | | |
|---|---|---|
| 2013/0165796 A1 | 6/2013 | Tashiro |
| 2013/0302655 A1 | 11/2013 | Deveau et al. |
| 2016/0109412 A1 | 4/2016 | Borigo et al. |
| 2016/0197382 A1* | 7/2016 | Sood ........................ B60L 58/16 429/92 |
| 2016/0223498 A1* | 8/2016 | Steingart ................ G01N 29/46 |

OTHER PUBLICATIONS

Hsieh et al., "Electrochemical-acoustic time of flight: in operando correlation of physical dynamics with battery charge and health," Energy Environ. Sci., vol. 8, Mar. 30, 2015, pp. 1569-1577.

International Preliminary Report on Patentability on PCT Application No. PCT/US2017/038576 dated Jan. 3, 2019, 10 pages.

Ladpli et al., "Battery charge and health state monitoring via ultrasonic guided-wave-based methods using built-in piezoelectric transducers," Proc. SPIE 10171, in the Proceedings of the SPIE Smart Structures and Materials + Nondestructive Evaluation and Health Monitoring, Portland, OR, USA, Mar. 2017, 13 pages.

Ladpli et al., "Design of Multifunctional Structural Batteries with Health Monitoring Capabilities," 8th European Workshop On Structural Health Monitoring (EWSHM 2016), Jul. 5-8, 2016, Spain, Bilbao, pp. 1-13.

Sood et al., "Health Monitoring of Lithium-Ion Batteries," EDFAAO, vol. 16, No. 2, 2014, pp. 4-16.

International Search Report and Written Opinion (ISA/KR) for International Application No. PCT/US2017/038576, dated Sep. 26, 2017, 13 pages.

Foreign Action other than Search Report on CN 2017800497783 dated Sep. 3, 2021.

Office Action for European Application No. 17816150.1 dated Oct. 27, 2022.

* cited by examiner (a)

(b)

BATTERY STATE MONITORING USING ULTRASONIC GUIDED WAVES

CROSS-REFERENCE TO RELATED APPLICATION

This application is a national stage entry under 35 U.S.C. § 371 of International Application No. PCT/US2017/038576, filed Jun. 21, 2017, which claims the benefit of U.S. Provisional Application No. 62/352,655, filed Jun. 21, 2016, the content of which is incorporated herein by reference in its entirety.

STATEMENT REGARDING FEDERALLY SPONSORED RESEARCH OR DEVELOPMENT

This invention was made with Government support under contract DE-AR0000393 awarded by the Department of Energy. The Government has certain rights in the invention.

BACKGROUND

Extensive research effort in energy storage, particularly in lithium-ion (Li-ion) batteries, has been ongoing in response to the ever-growing demand for high-energy light-weight energy solutions for portable devices, and in electric systems and transportation. Yet, their broader practical adoption has been hindered by the system's reliability, lifetime, safety, and cost. In view of the complexity of Li-ion batteries and their constrained operational envelope, accurate real-time state monitoring is desired for effective control and management.

On-board battery management systems (BMS) typically involve the monitoring of extrinsic parameters including voltage, current, and temperature. From these parameters, a battery's state of charge (SoC) and state of health (SoH) are approximated using state-estimation software. However, these techniques fail to account that a Li-ion battery is a composite material system that undergoes mechanical and chemical evolution as it cycles and ages.

In a laboratory, in-situ techniques, for instance X-ray diffraction and neutron imaging, can be used to effectively probe these physical changes. However, such techniques cannot be practically implemented, and in most cases are constrained for small-scale non-standard cells. The benefits of having elaborate electrochemical tools, for instance electrochemical impedance spectroscopy (EIS), on-board in an electric vehicle typically do not justify the significant additional cost and complexity.

It is against this background that a need arose to develop embodiments of this disclosure.

SUMMARY

Some embodiments of this disclosure relate to a method of battery state monitoring. In some embodiments, the method includes: (1) providing a battery cell and at least one ultrasonic actuator and at least one ultrasonic sensor mounted to the battery cell; (2) using the ultrasonic actuator, generating a guided wave that propagates in-plane of the battery cell; (3) using the ultrasonic sensor, receiving an arriving wave corresponding to the guided wave; and (4) determining a state of the battery cell based on the arriving wave.

Additional embodiments of this disclosure related to a battery. In some embodiments, the battery includes: (1) a battery cell; (2) a set of one or more ultrasonic transducers mounted to the battery cell; and (3) a controller configured to direct a first one of the ultrasonic transducers to generate a guided wave that propagates in-plane of the battery cell.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DESCRIPTION

Figure 1:
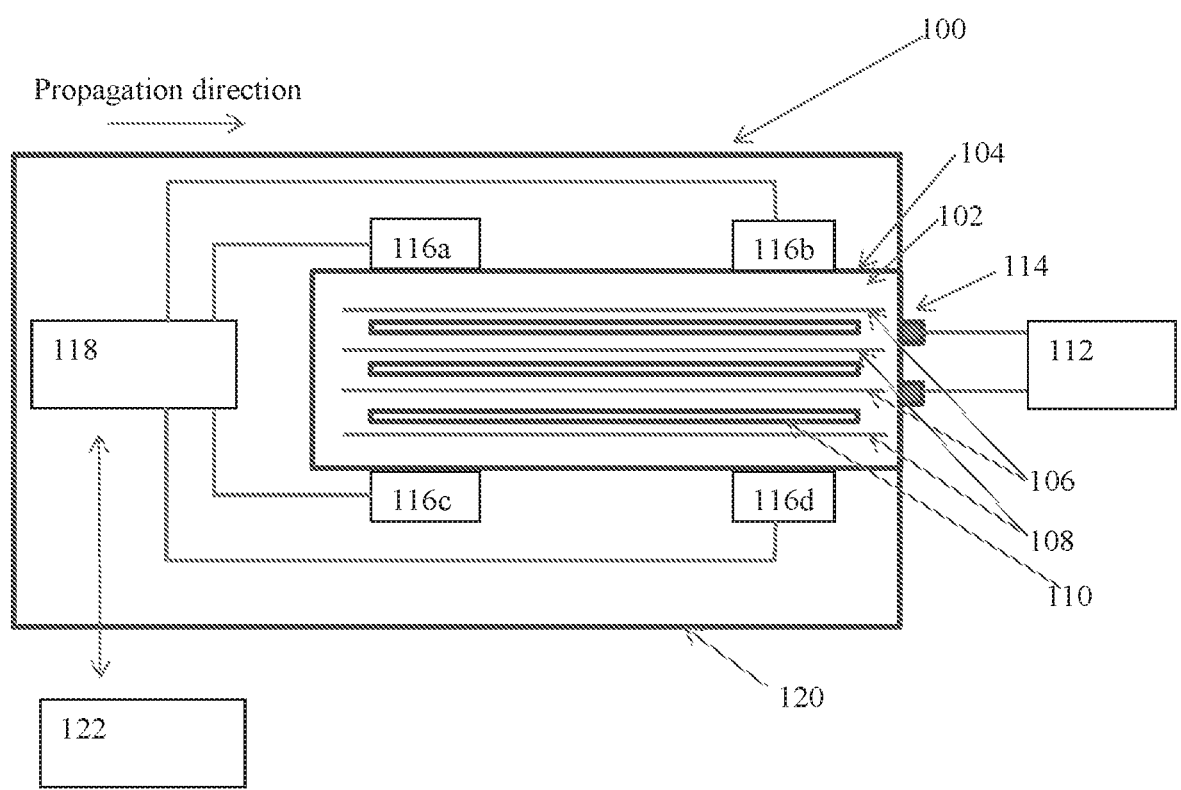
FIG. 1. Schematic of a battery configured with battery state monitoring capabilities according to some embodiments of this disclosure.

FIG. 1 illustrates a battery 100 configured with battery state monitoring capabilities according to some embodiments of this disclosure.

The battery 100 includes at least one battery cell 102, which includes an internal enclosure 104 and a set of one or more anodes 106 and a set of one or more cathodes 108 disposed within the internal enclosure 104. As illustrated, multiple anodes 106 and multiple cathodes 108 are included in the battery cell 102 and are arranged in an alternating manner in a thickness direction of the battery cell 102. Separators 110 are included in the battery cell 102 and are disposed between each adjacent pair of the anodes 106 and the cathodes 108. The battery 100 can be connected to a charger or a load 112 via terminals 114, such that a state of the battery cell 102 can be assessed during or in synchronism with, for example, charging or discharging of the battery cell 102.

Referring to FIG. 1, the battery 100 also includes at least one ultrasonic actuator 116a and at least one ultrasonic sensor 116b, 116c, or 116d. As illustrated, the ultrasonic actuator 116a and the ultrasonic sensors 116b, 116c, and 116d are similarly or identically configured as ultrasonic transducers, such as piezoelectric ceramic transducers or other piezoelectric transducers. Although four of such ultrasonic transducers 116a, 116b, 116c, and 116d are illustrated in FIG. 1, the number of ultrasonic transducers can take on other values, such as another value of two or greater. The ultrasonic transducers 116a, 116b, 116c, and 116d are permanently mounted to the battery cell 102 and, in particular, are fixedly or permanently mounted to the internal enclosure 104. A subset of the ultrasonic transducers 116a, 116b, 116c, and 116d, namely the ultrasonic transducers 116a and 116b, are mounted to one major surface of the battery cell 102, and another subset of the ultrasonic transducers 116a, 116b, 116c, and 116d, namely the ultrasonic transducers 116c and 116d, are mounted to another, opposite major surface of the battery cell 102; in other words, the ultrasonic transducers 116a and 116b and the ultrasonic transducers 116c and 116d are mounted to opposite sides of the battery cell 102. It is also contemplated that the ultrasonic transducers 116a, 116b, 116c, and 116d can be mounted to a same side of the battery cell 102.

The battery 100 also includes a controller 118, which is connected to the ultrasonic transducers 116a, 116b, 116c, and 116d to direct operation of the ultrasonic transducers 116a, 116b, 116c, and 116d and to determine a state of the battery cell 102 based on ultrasonic waves generated and received by the ultrasonic transducers 116a, 116b, 116c, and 116d. The controller 118 can be configured in hardware using electronic circuitry, or can be configured as a processor and an associated memory storing instructions executable by the processor. As illustrated, ultrasonic waves are generated and received in a pitch-catch mode where one ultrasonic transducer acts as an actuator to generate an actuation wave while at least one remaining ultrasonic transducer acts as a sensor to receive an arriving or sensing ultrasonic wave corresponding to the actuation wave. For example, the controller 118 can direct the ultrasonic transducer 116a to generate an actuation wave, and can direct the remaining ultrasonic transducers 116b, 116c, and 116d to receive incoming sensing waves corresponding to the actuator wave. The controller 118 can cycle through the ultrasonic transducers 116a, 116b, 116c, and 116d such that different ones of the ultrasonic transducers 116a, 116b, 116c, and 116d successively act as an actuator. Other manners of operating the ultrasonic transducers 116a, 116b, 116c, and 116d are encompassed by this disclosure. For example, the ultrasonic transducer 116a can sequentially act as both an actuator and a sensor, by receiving a reflected sensing wave corresponding to an actuation wave.

As illustrated, ultrasonic waves are generated and propagate in-plane of the battery cell 102. In particular, a propagation direction of such ultrasonic guided waves (or Lamb waves) is substantially parallel to either major surface of the battery cell 102, and is substantially perpendicular to the thickness direction of the battery cell 102. In some embodiments, a generated actuation wave is an excitation tone-burst signal including a high frequency burst wave with a center or main frequency ranging from about 100 kHz to about 2 MHz, such as about 100 kHz to about 1 MHz, about 100 kHz to about 500 kHz, about 100 kHz to about 200 kHz, or about 125 kHz to about 175 kHz. In some embodiments, a peak-to-peak amplitude of the actuation wave is about 50 V or greater, about 60 V or greater, about 75 V or greater, from about 50 V to about 200 V, from about 50 V to about 100 V, or from about 70 V to about 75 V. In some embodiments, the controller 118 can direct generation of actuation waves having different center or main frequencies or different peak-to-peak amplitudes to enhance accuracy of battery state monitoring, such as by cycling through a set of actuation frequencies or amplitudes.

Based on one or more parameters of at least one incoming sensing wave, the controller 118 is configured to determine a state of the battery cell 102, such as including a state of charge of the battery cell 102, a state of health of the battery cell 102, or other internal physical condition or parameter of the battery cell 102 (e.g., related to structural integrity, extent of delamination, and so forth), or a combination of two or more of the foregoing.

In some embodiments, the controller 118 is configured to determine a state of the battery cell 102 by performing time-domain analysis of at least one incoming sensing wave to derive one or more time-domain signal parameters. For example, the controller 118 can determine a state of charge of the battery cell 102 by deriving either of, or both, a time of flight of a sensing wave, which is a measure of a time duration for an actuation wave to reach a sensor (e.g., a time duration with respect to respective maximum or peak amplitudes of the actuation wave and the sensing wave), and an amplitude of the sensing wave, which is a measure of a maximum or peak amplitude of the sensing wave (e.g., a maximum or peak amplitude of the sensing wave's Hilbert envelope). Once derived, the controller 118 can compare the time of flight or the amplitude of the sensing wave with a set of one or more corresponding reference or baseline values, which can be calculated values based on a numerical model or can be based on pre-collected data from the same battery cell 102 or other similar battery cells. As another example and for a given state of charge of the battery cell 102 (e.g., a substantially fully charged state), the controller 118 can determine a state of health of the battery cell 102 by deriving either of, or both, a time of flight of a sensing wave and an amplitude of the sensing wave. Once derived, the controller 118 can compare the time of flight or the amplitude of the sensing wave with a set of one or more corresponding reference or baseline values, which can be calculated values based on a numerical model or can be based on pre-collected data from the same battery cell 102 or other similar battery cells. Additional examples of time-domain signal parameters include an energy of a sensing wave and a power of the sensing wave. Alternatively to, or in combination with, time-domain analysis, the controller 118 can be configured to determine a state of the battery cell 102 by performing frequency-domain analysis of at least one incoming sensing wave to derive one or more frequency-domain signal parameters, and comparing the frequency-domain signal parameters with a set of one or more corresponding reference or baseline values. For example, the controller 118 can determine a state of the battery cell 102 by performing a Fourier transform of a sensing wave and deriving a power spectral density of the sensing wave. Reference or baseline values can be stored in a memory included in, or connected to, the controller 118, such as in the form of a look-up table.

Through the inclusion of multiple sensors disposed at multiple different paths along which sensing waves arrive from an actuator, the controller 118 also can be configured with capabilities to determine a spatial distribution of a state of charge or a state of health of the battery cell 102, and to determine a location of mechanical, electrochemical, or other defects within the battery cell 102. For example and given pre-determined locations of sensors relative to an actuator, a spatial distribution of a state of charge or a state of health of the battery cell 102 can be determined based on absolute or relative differences (or differences in trend) in time-domain or frequency-domain parameters of sensing waves arriving at the sensors. The spatial distribution of a state of charge or a state of health of the battery cell 102 can be presented in the form of, for example, an image or other visual representation of the battery cell 102, along with an indication of spatial variations of the state of charge or the state of health within the battery cell 102.

As illustrated, the battery 100 also includes an external enclosure 120, and the controller 118, the ultrasonic transducers 116a, 116b, 116c, and 116d, and the battery cell 102 are disposed within the external enclosure 120.

Other configurations of the components of the battery 100 are encompassed by this disclosure. For example, the ultrasonic transducers 116a, 116b, 116c, and 116d can be disposed within the internal enclosure 104 of the battery cell 102, and can be disposed adjacent to, or in contact with, one or more active components of the battery cell 102, such as one or more of the anodes 106 and the cathodes 108. As another example, rather than being permanently mounted to the battery cell 102, the ultrasonic transducers 116a, 116b, 116c, and 116d can be disposed external to the battery 100, and can be temporarily or removably disposed adjacent to (e.g., through a coupler or other interface material), or in contact with, the battery 100 during battery state monitoring. As another example and in place of, or in combination with, an ultrasonic transducer, the ultrasonic actuator 116a can be configured as a laser source configured to apply non-contact, laser-generated guided waves, an ablative source configured to apply guided waves, or a thermo-elastic source configured to apply guided waves. As another example and in place of, or in combination with, ultrasonic transducers, one or more of the ultrasonic sensors 116b, 116c, and 116d can be configured as vibrometers, such as non-contact laser Doppler vibrometers or scanning laser Doppler vibrometers. As an another example, the controller 118 can be configured to collect information related to one or more sensing waves, and convey the information to a computing device 122 external to the battery 100 and connected to the controller 118 via a wired or wireless link, and the computing device 122 can determine a state of the battery 100 based on the conveyed information. As a further example, either of, or both, the controller 118 and the computer device 122 can generate an alert or other visual or audio indication of a state of the battery 100.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Example 1

Battery Charge and Health State Monitoring Via Ultrasonic Guided Wave-Based Methods Using Built-in Piezoelectric Transducers Overview:

This example presents a scalable and field-deployable framework for monitoring lithium-ion (Li-ion) battery state of charge (SoC) and state of health (SoH), based on ultrasonic guided waves using low-profile built-in piezoelectric transducers. The feasibility of this technique is demonstrated through experiments using surface-mounted piezoelectric disc transducers on commercial Li-ion pouch batteries. Pitch-catch guided-wave propagation is performed in synchronization with electrical charge and discharge cycling, and cycle life testing. Time-domain analysis shows strong and repeatable correlation between waveform signal parameters and battery SoC and SoH. The correlation thus provides a building block for constructing a technique for accurate real-time monitoring of battery charge and health states using ultrasonic guided wave signals. Moreover, capacity-differential signal analysis reveals the underlying physical changes associated with cyclic electrochemical activities and phase transitioning. This finding allows accurate pinpointing of the root cause of capacity fade and mechanical degradation. The results of this example indicate that the use of guided waves can provide an avenue for in-situ characterization of Li-ion batteries, providing insight on the complex coupling between electrochemistry and mechanics.

Introduction:

This example presents a scalable and field-deployable technique for Li-ion battery SoC and SoH monitoring with ultrasonic guided waves, using reduced-footprint built-in piezoelectric wafer transducers. The mechanical wave propagation through a battery medium is found to accurately reflect the changes in mechanical properties as a battery charges, discharges, and ages. Analysis of the experimental guided wave signals shows strong correlation between signal parameters, SoC and SoH, indicating the technique can be used to effectively determine battery states in a practical setting. Waveform features also demonstrate a battery's phase transitioning and intercalation-induced physical changes, opening a path for in-situ characterization of Li-ion batteries and other electrochemical systems.

Comparative techniques using ultrasonic measurements for probing Li-ion batteries are based on through-thickness transmitted and reflected bulk waves, which usually specify external bulky ultrasonic probes and equipment, involve extensive operator intervention, and suffer from inaccurate baseline collection.

The rest of this example is structured to present the following, in respective order: method of approach, experimental set-up and procedure, and experimental results. The discussion will be made alongside the results, showing contributions which include:

Establishment of a correlation between Li-ion battery's SoC with guided wave signal parameters.
Illustration of the phase transitioning and mechanical evolution through capacity-derivative analysis.
Demonstration of SoH monitoring via tracing the aging-induced progression of signals.
Identification of the root cause of capacity fade and mechanical degradation with guided waves.

Method of Approach:

Prediction of SoC and particularly SoH is a challenging task for Li-ion battery system integration, with implications on accuracy, robustness, expensive computation, and cost. On-field applications often rely on rudimentary voltage measurements and software-based prediction because the benefits of having laboratory equipment and electrochemical tools on-board do not justify the cost and complexity. Hence it is desired to develop an online, scalable, reduced-footprint technique to probe a battery's state in service.

Figure 2:
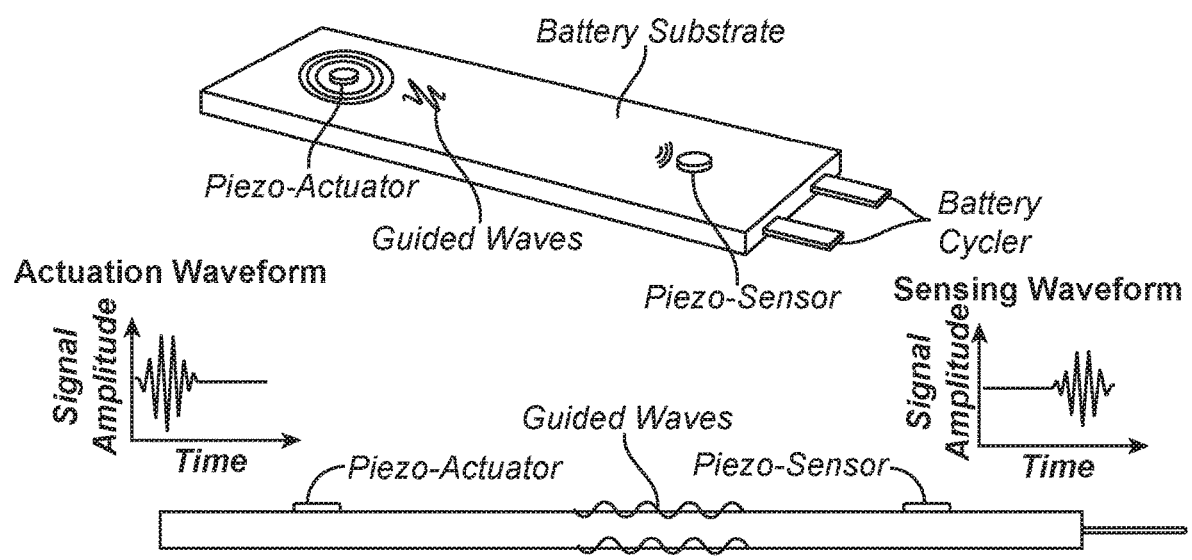
FIG. 2. Schematics of ultrasonic guided wave propagation in Li-ion battery substrate, using surface-mounted low-profile piezoelectric transducers.

Therefore, this example sets forth a feasibility analysis of using mechanical guided wave propagation for probing and correlating the evolution of mechanical phenomena with a battery's SoC and SoH. An experimental study is performed on as-received commercial Li-ion pouch batteries with surface-mounted piezoelectric transducers (FIG. 2). The guided waves interact with the propagation battery medium, allowing the progression of the medium's physical properties to be interrogated during charging, discharging, and aging. Signal analysis is then performed to reveal correlation with SoC and SoH and provide a framework for a real-time on-demand battery state monitoring.

Experimental Set-Up and Procedure:

Experiments are performed on commercial Li-ion pouch batteries, with graphite/nickel-manganese-cobalt oxide (NMC) chemistry. The fresh batteries have a nominal capacity of about 3650 mAh (about 135×45×5 mm), and are tested as received from the manufacturer after a standard formation protocol. Four about 6.35 mm-diameter disc piezoelectric transducers (PZT-5A) in the SMART Layer format (Acellent Technologies, Inc.) are attached on surfaces of each battery using Hysol E20HP structural epoxy adhesive, according to the schematics shown in FIG. 3b.

Figure 3:
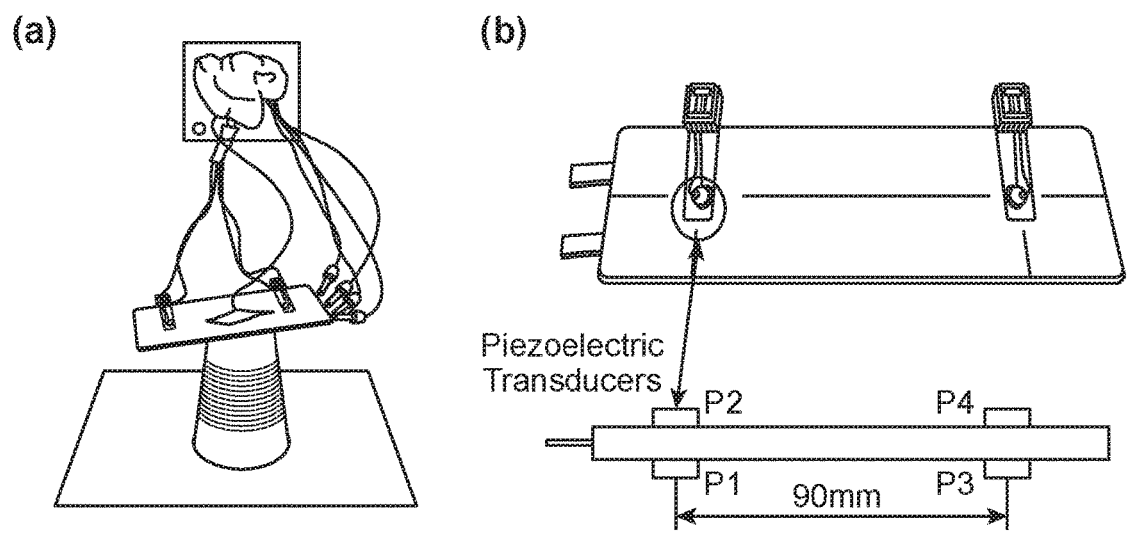
FIG. 3. (a) Experimental set-up used for electrical cycling and guided wave data acquisition, in a low-temperature gravity-convection oven; and (b) sensor locations on a 3650 mAh pouch battery, labeled P1 through P4.

The ultrasonic data acquisition is synchronized with an eight-channel battery analyzer (BST8-3, MTI Corporation). The electrical cycling is performed with the batteries at a substantially constant temperature in a low-temperature gravity-convection oven (FIG. 3a). The piezoelectric transducers are actuated and sensed with five-peak Hanning-windowed tone bursts, using a 64-channel ultrasonic data acquisition system (ScanGenie II model; Acellent Technologies, Inc.). The peak-to-peak amplitude of the actuation signals is about 75 V. The center frequencies of the signals span between about 100 kHz to about 200 kHz and are selected so as to obtain clear wave packets in the sensor response. The ultrasonic measurements are taken every about 1 minute during electrical charge discharge cycles.

Figure 4:
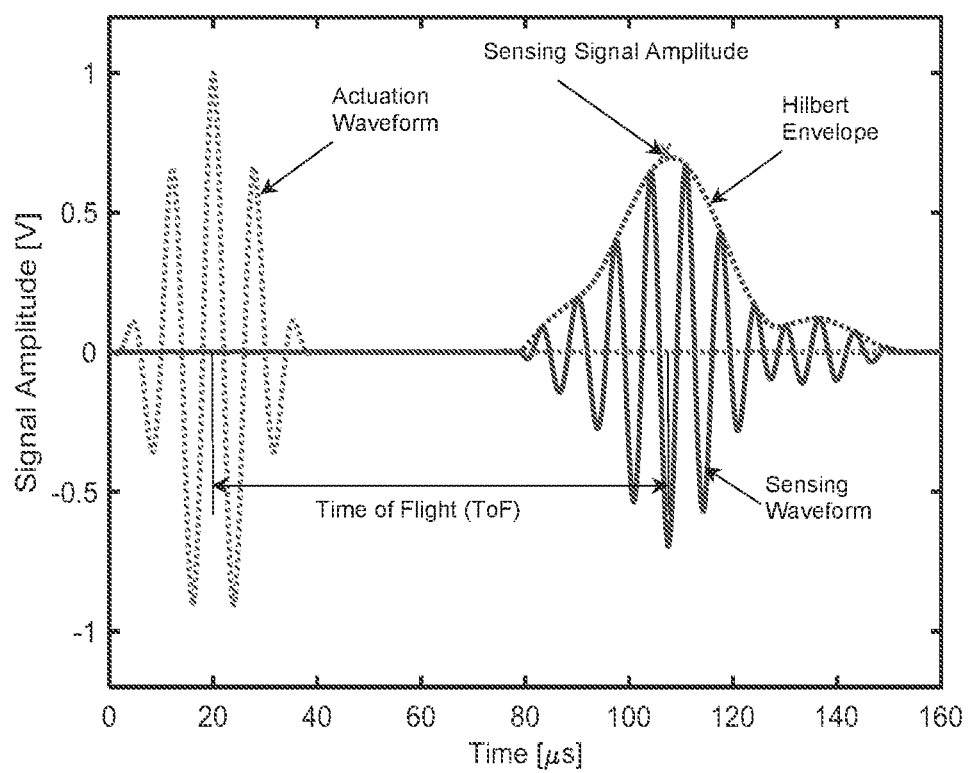
FIG. 4. Representative signals from a P1-P3 transducer pair, using a tone-burst excitation at about 125 kHz. The plot shows the time of flight (ToF), which is the time taken for an actuation pulse to reach a sensor location, and a signal amplitude, which is the maximum amplitude of a sensing signal's Hilbert envelope.

Guided wave signals are collected in a pitch-catch mode whereby one transducer acts as an actuator and the others sense the incoming waves, resulting in a representative actuator-sensor response shown in FIG. 4. This example focuses on the time-domain analysis of the signals. FIG. 4 shows the two time-domain parameters of interest: the (sensing) signal amplitude, which is the maximum amplitude of the sensing signal's Hilbert envelope, and the time of flight (ToF), which is the measure of the time taken by an actuation wave packet to reach a sensor.

Results and Discussion:

Variation in ToF and Signal Amplitude with SoC

Figure 5:
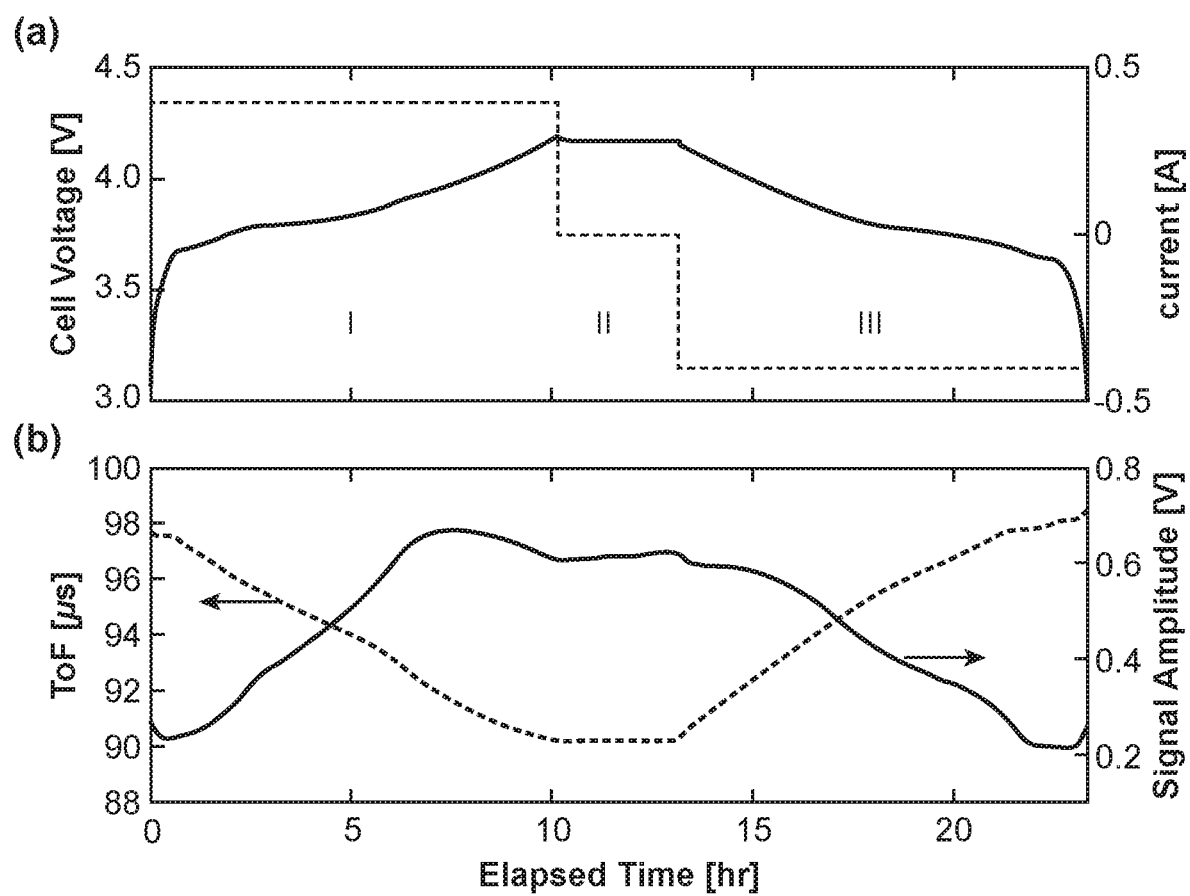
FIG. 5. (a) Voltage and current data during an about C/10 charging and discharging cycle, showing the charging phase (Region I), rest period (Region II), and discharging phase (Region III); and (b) corresponding evolution of ToF and signal amplitude data taken every about 1 minute (from a P1-P3 transducer pair at about 125 kHz).

The Li-ion batteries are cycled at an about C/10 rate (a current rate at which the batteries would be fully charged in about 10 hours), or about 365 mA, at a substantially constant temperature of about 30° C. As shown in FIG. 5a, the cycle starts with charging at a substantially constant current of about 365 mAh (Region I) to a cutoff voltage of about 4.2 V. An about 2-hour rest (Region II) is added before discharging at about 365 mAh (Region III) to a cutoff voltage of about 3.0 V. The rest time between discharge and charge (not shown) is also set to about 2 hours.

Figure 6:
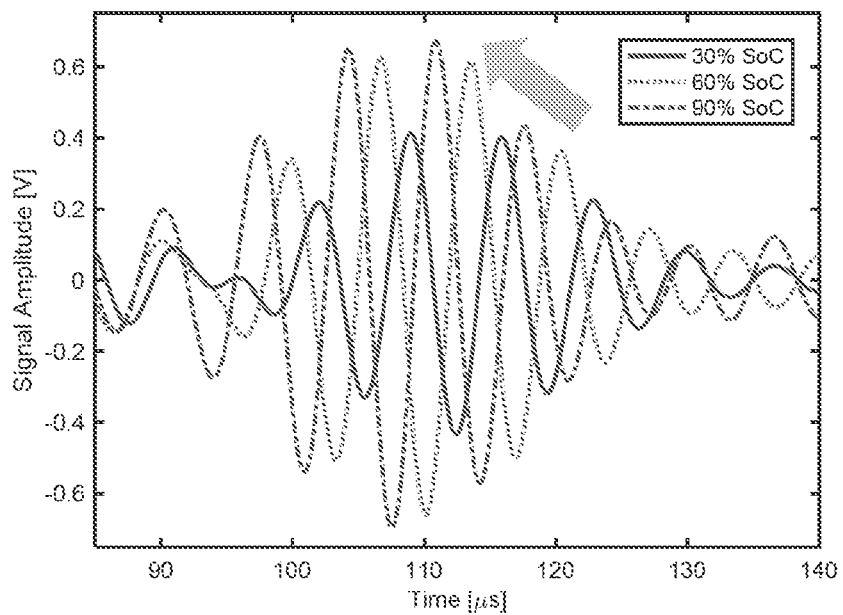
FIG. 6. Influence of SoC on a guided wave sensing signal during charging, showing increase in signal amplitude and shorter ToF with increasing SoC (from a P1-P3 transducer pair at about 125 kHz).

Guided wave signal snapshots are analyzed over the period of the charge and discharge cycle, uncovering the behavior of the time-domain signal parameters with varying SoC. FIG. 6 shows the receiving wave packet from a representative cell, at three instances in time during the charging phase at three SoC levels (about 30%, about 60%, and about 90%), from the P1-P3 transducer pair, with a center frequency of about 125 kHz. It can be seen that the wave packet moves faster, namely the ToF gets smaller, as SoC increases. At the same time, the signal amplitude of the receiving waves intensifies with increasing SoC.

Extracting and compositing the time-domain signal parameters in the same fashion at all SoC results provide the behavior presented in FIG. 5b, in comparison with the terminal voltage and applied current in FIG. 5a. The ToF and signal amplitude are plotted against the elapsed time of the charge and discharge cycle. The ToF decreases monotonically during discharging, accounting for a net change of about 7 μs, and vice versa for the discharge process. The increasing wave speed as the battery is charged indicates changes in the composite medium's mechanical properties, most probably increasing modulus and/or declining stiffness. This finding is in agreement with results showing decrease in graphite anode's and cathode's densities, and increase in graphite's modulus during charging. The NMC cathode can take on a lower modulus value with increasing cell SoC; however, the absolute change of the cathode's modulus can be much smaller than that of the anode.

As seen in FIG. 5b, the signal amplitude, on the other hand, increases with SoC for the majority of the charging process (terminal voltage between about 3.7 V and about 3.95 V), except at the very beginning and at the end of charging. As the charge current is removed during the rest step, the signal amplitude relaxes slightly to an equilibrium level. Discharging is associated with minor fluctuation in signal amplitude at the beginning, then sees a monotonic decrease mostly through the rest of the process. The signal amplitude then increases sharply at the very end of discharging (terminal voltage < about 3.6 V). While the ToF of the electrode composite can be calculated reasonably accurately through a numerical model, the interpretation of signal attenuation's behavior is not straightforward as the propagation involves anisotropy, porosity, multiple phases, and interfaces.

It is evident that there is a strong correlation between the signal features of ultrasonic guided waves and the battery SoC, making guided waves a viable technique for SoC estimation. Changes in the SoC are reflected in the changes in the density and elastic modulus of the anode and cathode materials, which in turn affect the behavior of the guided waves. Moreover, variations in the slopes of the signal amplitude and ToF versus time are seen at different instances throughout the charge and discharge processes. Besides the effect from the cathode phase transition, these non-linearities can be primarily induced by the intercalation staging in the graphitic anode, as will be discussed in the following section.

Differential ToF Revealing Phase Transitions

As observed in FIG. 5b, although discernable, the sharp non-linear features are not well pronounced in the measured cell voltage curve. Using a voltage differential technique, the first derivative of the voltage with respect to SoC during charging and depth of discharge (DoD) during discharging, dV/dQ, is calculated to identify the underlying phases. The first derivative of the ToF with respect to SoC and DoD (dToF/dQ) can be calculated similarly to illustrate the phase-transition features in the ToF data.

Figure 7:
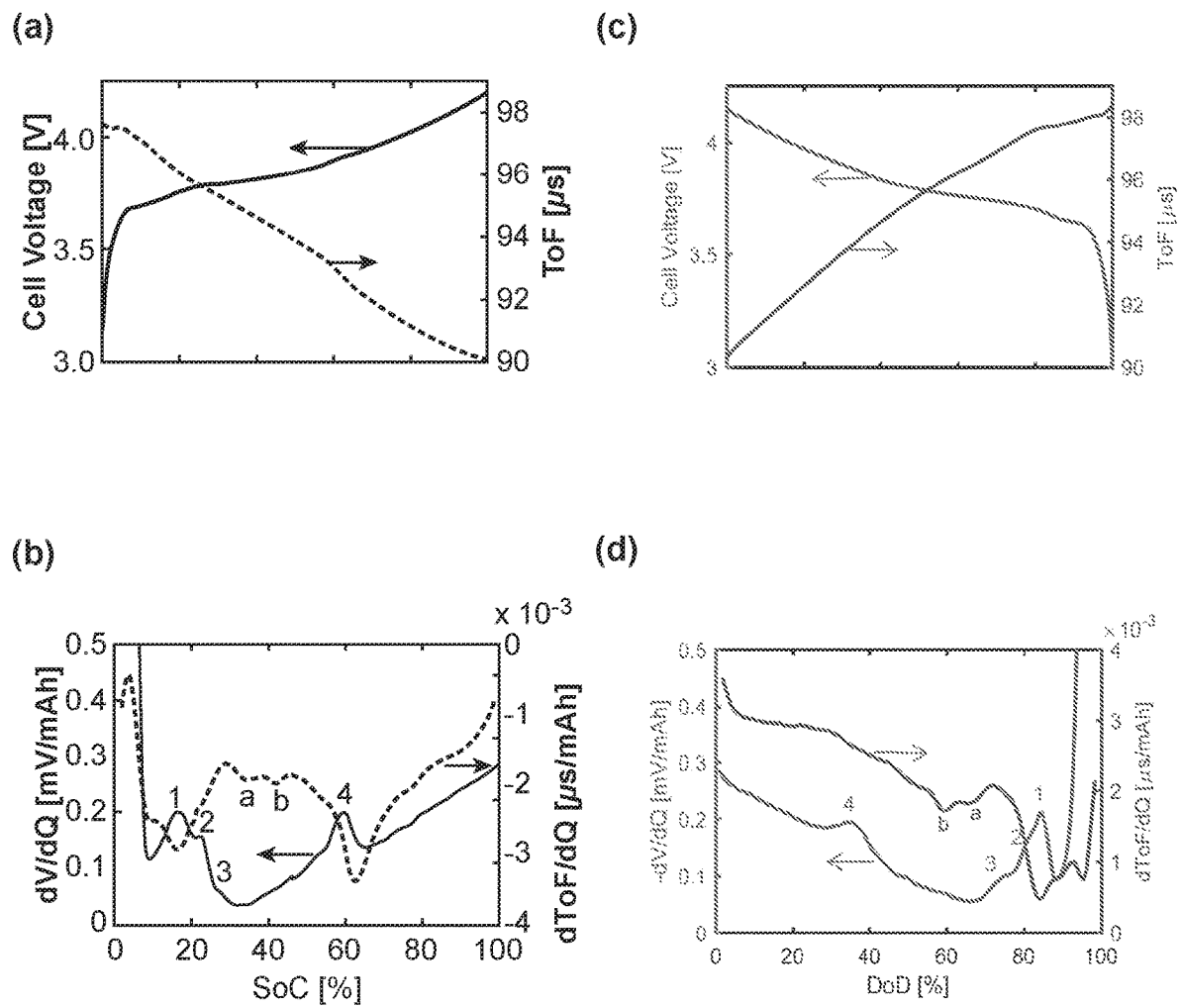
FIG. 7. (a and c) Voltage and ToF data for an about C/10 cycle during charging and discharging, respectively; and (b and d) corresponding first derivative of voltage and ToF with respect to capacity (dV/dQ and dToF/dQ) during charging and discharging, respectively. Negative values of dV/dQ are plotted in (d) to represent discharging. Guided wave signals are from a P1-P3 transducer pair at about 125 kHz.

FIG. 7 shows dV/dQ and dToF/dQ with respect to SoC and DoD, during charging and discharging respectively. Pertaining to the nature of the NMC cathode, the global concave feature can be recognized in the calculated dV/dQ with respect to the SoC. The local dV/dQ peaks can be associated with the stages of the graphite anode as it undergoes charging and discharging. The peaks are labeled 1, 2, 3, and 4 with increasing SoC levels (about 17%, about 23%, about 26%, and about 60% SoC, respectively), and in reverse with increasing DoD. These peaks in dV/dQ coincide with the sharp activities in the calculated dToF/dQ. Two additional troughs have been identified in dToF/dQ, although not evident in dV/dQ, at about 33% and about 42% SoC, which also can be ascribed to graphite staging.

More experiments, such as cyclic voltammetry, can be conducted to confirm the presence of the transition stages and correlating the features in guided wave signals. Additionally, as phase transitioning occurs in a cell, it is hypothesized that changes in electrode's moduli and densities are simultaneously enhanced resulting in the peaks in dToF/dQ. Even though changes in electrodes' moduli and densities are documented, their global behavior has been observed. Therefore, the differential ToF can provide a technique for accurately probing the transitioning behavior of battery's mechanics during charging and discharging.

It is also noted that the symmetry that is exhibited in dV/dQ during charging versus discharging is not shown in dToF/dQ. While discharging approximately reverses charging potential-wise, differences between charging and discharging are demonstrated through guided wave signals. Most likely, removal and insertion of lithium from the graphite anode to the NMC cathode during discharging result in different characteristics of modulus and density distribution, as compared to the inverse charging process.

Impact of Cell Aging

Following the charge-state analysis, an accelerated aging experiment is performed by aggressively charging and discharging the batteries to evaluate the impact of cell degradation on guided wave signals. The cells are cycled at an elevated temperature of about 45° C. with a higher current rate of about 3000 mA (about 0.8 C) between about 3.0 V and about 4.2 V. A constant-voltage (CV) step is added after the cells have been charged to the maximum cutoff voltage, until the current drops to a cutoff value of about 182.5 mA (about C/20). The rest time before the discharge step is set to about 15 minutes, with no rest period after discharging before the next charge step. A total of 200 charge and discharge cycles are performed.

Figure 8:
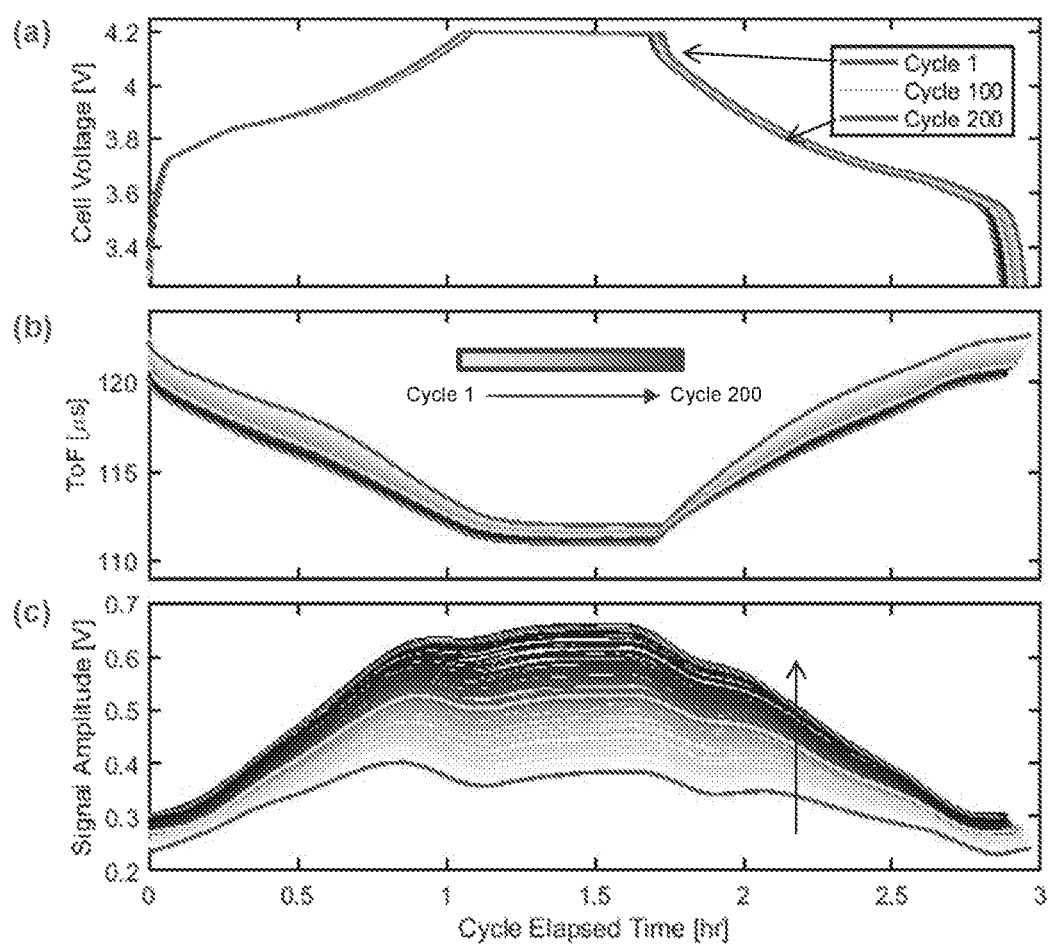
FIG. 8. Cycle-to-cycle evolution of (a) terminal voltage, (b) ToF, and (c) signal amplitude, due to electrochemical aging shown in progressive shades of gray as a function of cycle elapsed time. Data from the first cycle, the $100^{th}$ cycle, and the $200^{th}$ cycle are indicated. Guided wave signals are from a P1-P3 transducer pair at about 125 kHz.

The evolution of the signal parameters with increasing cycle number is shown in FIGS. 8b and 8c, respectively, while the terminal voltage profile is plotted in FIG. 8a. An interesting behavior was observed in the cyclic ToF and signal amplitude as the battery ages. The ToF appears to globally shift towards a lower value, namely the wave speed is slower, with increasing cycle number. It should be noted that the shift in ToF due to aging is more prominent close to the end of discharge and the beginning of charge. It can also be seen that during charging and discharging, unlike in the rest period, the decrease rate of ToF with cycle number is not constant at a specific elapsed time (about the same SoC); namely, the decline in ToF is more dramatic during the first 100 cycles than the latter half. On the other hand, as the cycle count increases, the signal amplitude gradually intensifies at all SoC levels. The amplification in the signal amplitude is less dramatic at the end of discharge and beginning of charge than elsewhere. Unlike ToF behavior, at a given SoC, the rate at which the signal amplitude increases with respect to the cycle count is about constant with the cycle number.

The change in ToF and signal amplitude can be ascribed to changes in mechanical properties (e.g., moduli and densities) due to battery degradation. Lower ToF and higher signal amplitude indicate that aging can increase the battery's overall stiffness and/or lower the density. The scarcity and excess of lithium ions near the end of charge or discharge can also cause the abrupt stiffness change. The non-uniformity and rate-dependence are otherwise relaxed during the rest step.

Figure 9:
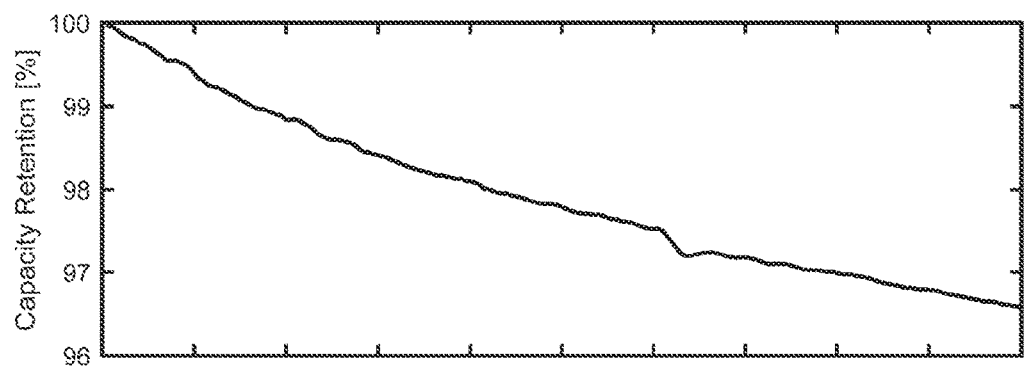
FIG. 9. (a) Capacity retention (normalized by the first-cycle capacity) as a function of the cycle number; and (b) correlation between cycle number and guided wave signal amplitude and ToF at the end of rest period after charging, showing monotonic increase in signal amplitude and decrease in ToF with capacity fade. Guided wave signals are from a P1-P3 transducer pair at about 125 kHz.
Figure 9:
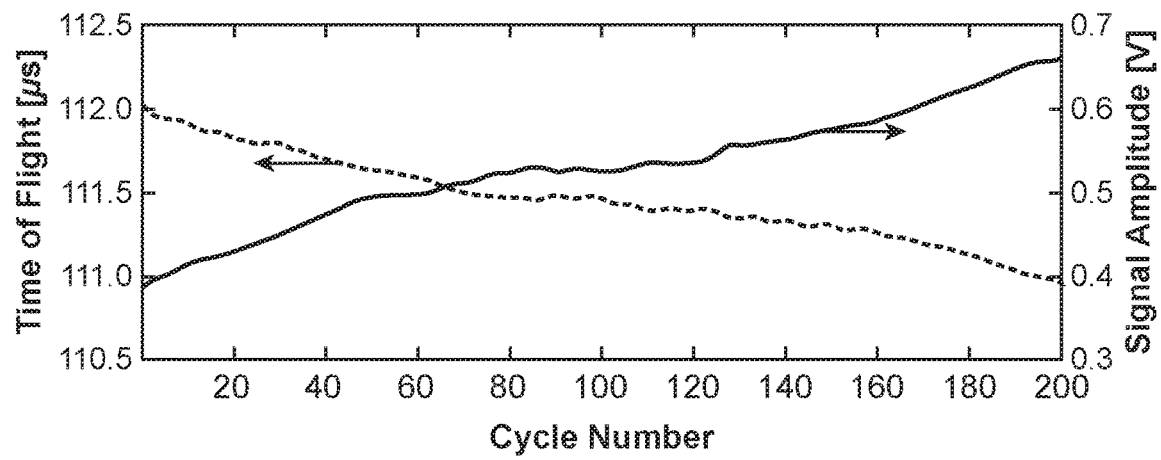

So as to filter out the rate and SoC effects, the ToF and signal amplitude at the end of the rest step for every cycle are extracted and shown in FIG. 9b. The remaining capacity with respect to the cycle number is plotted in FIG. 9a for comparison. A noticeable correlation between the guided wave signal parameters and the cycle count, and thus capacity fading, can be observed. As the battery ages, the ToF, at a substantially fully-charged relaxed state, declines, while the signal amplitude increases, though not linearly with cycle count. This finding can be useful for developing a technique for the determination of SoH and remaining useful life. In service, when the batteries are substantially fully-charged and at rest (e.g., a fully-charged electric vehicle at idle), the batteries can be probed for the guided wave ToF and amplitude. The SoH can be estimated by comparing the current signal parameters with the values from a look-up table (similar to FIG. 9b) pre-collected from a set of baseline cell, or even predicted for a number of cycles ahead.

Analysis of Aging Mechanisms Through Differential ToF

The causes and mechanisms of capacity fading in Li-ion batteries can be complex, involving side reactions, irreversible loss of active materials, and so forth. The differential voltage analysis can effectively probe the degradation mechanisms in Li-ion batteries and uncover the degradation process in the life of a battery. Similarly, through a differential ToF analysis, the shifts in the derivative of the guided wave signal features can be used to pinpoint the underlying degradation process.

Figure 10:
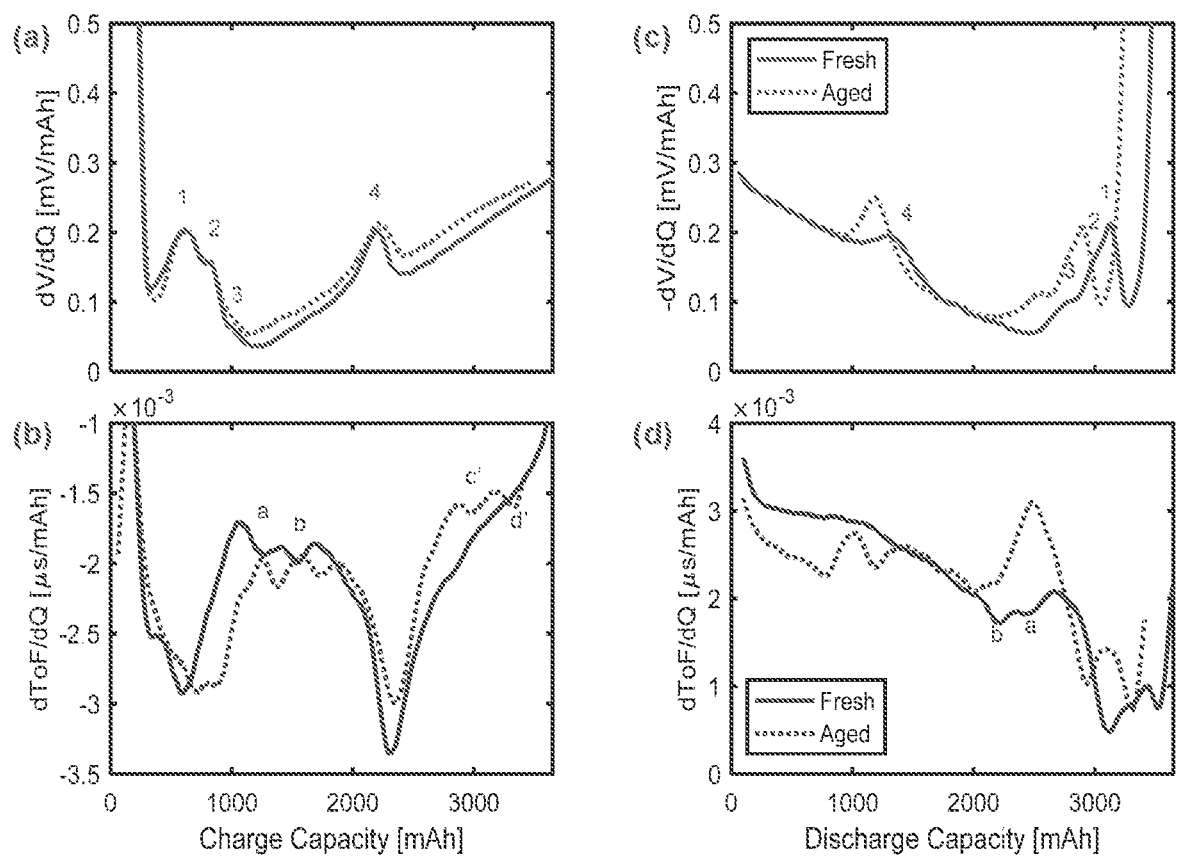
FIG. 10. Impact of aging on differential voltage and ToF. (a and c) dV/dQ with respect to charge and discharge capacity, during charging and discharging, respectively. Data from a fresh cell is indicated in solid line, post-cycled data indicated in dotted line; and (b and d) corresponding dToF/dQ. Guided wave signals are from a P1-P3 transducer pair at about 125 kHz.

The first derivative of the terminal voltage, dV/dQ, is calculated for the about C/10 cycle (at about 30° C.) of a fresh cell and after the aforementioned 200-cycle aging, as shown in FIGS. 10a and 10c, for charging and discharging respectively. As a comparison, dToF/dQ before and after aging is plotted in FIGS. 10b and 10d, respectively. The most pronounced activity is the shift of the dV/dQ peaks labeled 1 through 4 towards a higher SoC as the cell ages, accompanied by dramatic activities in dToF/dQ at the same capacity levels. The dToF/dQ analysis also reveals two additional troughs due to degradation during charging, labeled c' and d' near the end of charge, which are otherwise not evident in dV/dQ. It is also noted that apart from a subtle change in the concavity of dV/dQ and dToF/dQ, the relative distance between the peaks and troughs remain about the same, as can be observed from the gap between the peaks 1 and 4.

It can be concluded that the degradation mechanisms that cause the changes observed in dV/dQ are fundamentally mechanical phenomena, namely changes in moduli and densities, because similar activities are also demonstrated in guided wave dToF/dQ. That the relative peak-to-peak distances remain intact indicates that there is little loss of the active negative electrode (graphite) material, namely the number of active sites in graphite for lithium intercalation, remains substantially constant. The shift of dV/dQ and dToF/dQ is therefore ascribed to the irreversible loss of lithium ions, most probably due to the solid electrolyte interface (SEI) layer formation on the graphitic electrode. The slight change in the concavity may also be associated with the positive material (NMC cathode) loss. Nonetheless, the degradation phenomena inferred from the differential ToF are remarkably in line with those reported for high-temperature cycling of graphite/NMC Li-ion batteries, demonstrating aging that involves lithium loss accompanied by moderate cathode capacity loss.

Conclusions:

This example demonstrated the feasibility of using ultrasonic guided waves, with small-footprint surface-mounted piezoelectric transducers for probing a Li-ion battery's states during charging and discharging, as well as cycle life aging. Pitch-catch guided-wave signal parameters are obtained from built-in piezo-transducers on Li-ion batteries during cycling and aging processes. The obtained results indicate that this technique can be an effective real-time in-service method for accurately estimating SoC and SoH. In essence, it has been shown herein that:

The time domain analysis of guided-wave signal parameters, namely ToF and signal amplitude, provides a strong repeatable correlation with a battery's SoC, hence providing a method for non-electrical-contact SoC estimation.

The evolution of cyclic ToF and signal amplitude as a result from capacity fade infers the mechanical nature of battery degradation. Complimentary to the traditional voltage-based measurement, guided-wave signals deliver additional information, desired for directly determining SoH.

The differential ToF analysis can uncover the phase transition behavior, coinciding with enhanced distribution and redistribution of electrodes' mechanical properties during charging and discharging. Tracing the evolution of dToF/dQ due to aging can provide a non-invasive in-situ technique for determining the root cause of cycle life deterioration.

Guided-wave analysis can assist in providing fundamental insights on structural and mechanical activities inside a battery, such as moduli, porosity, and densities, beyond electrochemical methods.

Correlation of signal parameters with physical phenomena of a battery undergoing charging and discharging can be performed the aid of numerical modelling. Further, the results presented can be used in establishing a guided wave-based model for real-time SoC and SoH prediction. As with guided wave-based structural health monitoring (SHM), the concept can also be extended and applied to structural energy storage, for simultaneous structural and battery state monitoring.

Example 2

Design of Multifunctional Structural Batteries with Health Monitoring Capabilities Overview:

This example presents the development of Multifunctional Energy Storage (MES) Composites—a multifunctional structural battery which embeds Li-ion battery materials into high-strength composites together with in-situ networks of sensors and actuators. MES Composites can supply electrical power and also serve as structural elements, capable of concurrently carrying mechanical loads. In addition, the built-in sensor/actuator networks can monitor the state and health of both of the composite structure as well as the battery on a real-time on-demand basis. As part of an evaluation, MES Composite batteries are fabricated and then undergo a series of characterization tests to evaluate the synergistic energy-storage and load-carrying functionalities. Data generated from built-in sensors are also used to characterize the battery's state of charge and health, in comparison with results from electrochemical reference performance tests, and quantify any non-catastrophic degradation in the electrochemical performance. The obtained results verify the multifunctional capabilities of MES Composites for developing a reduced-weight and efficient energy storage system.

Introduction:

More and more advanced high-performance energy storage technologies are being developed to meet the demands of various mobile and vehicle applications, particularly when related to high-energy Li-ion batteries. Comparative approaches for electric vehicle (EV) energy storage systems focus primarily on increasing cell-level energy density, in order to reduce the energy-to-weight ratio, extend the range and performance, and reduce the cost. However, for state-of-the-art EVs, the system-level functional weight can be as much as twice the weight of cells due to the extensive mechanical protection and enclosures, as well as the additional monitoring and sensing systems to sustain the useful life of batteries. These disparate protective components reduce the packing factor and greatly decrease the system-level effective energy density. Moreover, the advantages of high-energy-density cells are also largely offset by the complexity and cost of more demanding system-level engineering specifications.

As it stands, the vehicle-level energy density of EVs, as well as their system cost, is still not at an economically viable level, and has been a barrier against a widespread adoption of EVs and electric systems. Thus, multifunctional energy storage designs are desired.

A multifunctional energy storage design can significantly improve the system-level specific energy by freeing-up EV energy storage from the inclusion of protection and monitoring systems while allowing additional functionalities, thus removing component redundancy. In essence, such a multifunctional design of the energy storage system should be able to substitute the functionalities of the three components: 1) the energy storage itself; 2) supporting structures and mechanical protection enclosures; and 3) monitoring and sensing systems.

The concept of using energy storage materials concurrently as a structural element, liberating the inclusion of extra mechanical protection, is desired. Furthermore, in-situ integration of monitoring and sensing capability to energy storage materials, let alone to structural energy storage, remains desirable.

Batteries can operate safely and reliably in a constrained envelope, thus specifying accurate state-estimation, control and management systems. Obtaining an accurate estimation of a battery's state of charge (SoC) during actual operation has been a challenge. Comparative techniques use voltage and current measurements (and temperature in some cases), and from data time-history, a cumulative energy consumption is calculated via state-estimation models. The numerical time integration, the dynamic nature of the battery usage, and the measurement noise often lead to large cumulative errors making it difficult to obtain a satisfactory accuracy in SoC estimation. Additionally, a remaining useful life of a battery, or the state of health (SoH), degrades over time. The model parameters for the state-estimation models have to be continuously updated during operation to reflect battery degradation, such as an impedance growth, but represent approximations due to the lack of precise laboratory equipment on-board.

The charge and health state of an electrochemical cell is physically coupled with the distribution and changes in material properties, such as the density and modulus. These material property changes, which are induced electrochemically, can also be treated as anomalies in comparison with a-priori reference material and structural properties and health states (baseline states). Hence, generalizing the concept to a multifunctional structural battery, both the structural and electrochemical states can be simultaneously determined, using in-situ distributed sensors that can sense various underlying physical phenomena and external stimuli, in combination with advanced signal processing and system identification techniques.

Therefore, this example presents the development of MES Composites, an improved form of structural batteries with in-situ networks of sensors and actuators, capable of simultaneously storing energy, carrying mechanical loads, and providing real-time status on structural integrity and battery health. Some results focusing on the structural construction and the electrochemical-mechanical performance have been developed. This example presents the concept of combined structural and battery health monitoring for multifunctional structural energy storage.

Method of Approach:

To achieve a system-level energy density performance at an economically feasible level, an improved multifunctional design of an EV energy storage system is desirable. The design should combine functionalities of the three main components for a working electric system: 1) energy storage; 2) supporting structures and mechanical protection enclosures; 3) battery monitoring and sensing systems.

Figure 11:
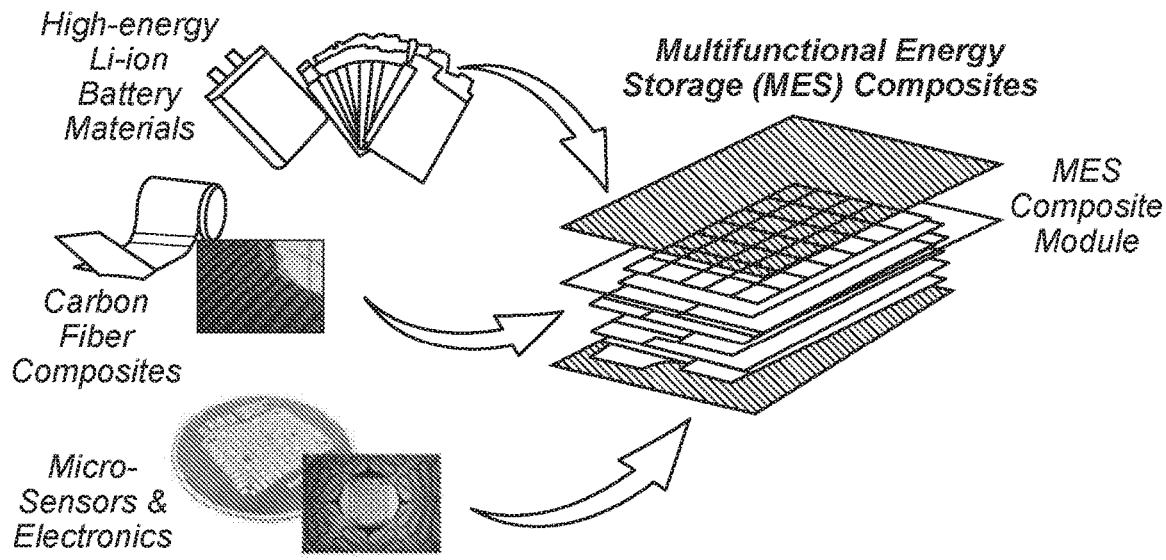
FIG. 11. Multifunctional Energy Storage (MES) Composites embedding Li-ion battery materials inside high-strength carbon-fiber composites, together with in-situ networks of sensors and actuators.

Hence, this example presents the development of an improved structural battery with integrated health monitoring capabilities (MES Composites), which integrates high-energy Li-ion battery materials into high-strength composites together with in-situ networks of sensors and actuators (FIG. 11). MES Composites can simultaneously store energy, serve as a structural building-block, as well as have the capability of sensing and monitoring the structural and battery health on a real-time basis. This multifunctional energy storage building-block is highly scalable and can potentially deliver considerable weight and volume savings at the system-level for various types of EVs and electric systems, for instance, electric cars, aircraft, and space vehicles.

The improved architecture and multifunctionality of MES Composites are attained through two features:

A vertical material integration technique allows Li-ion battery materials to be embedded into high-performance structural carbon-fiber composites while optimizing for electrochemical and mechanical performance. This aspect will be described below.

Figure 12:
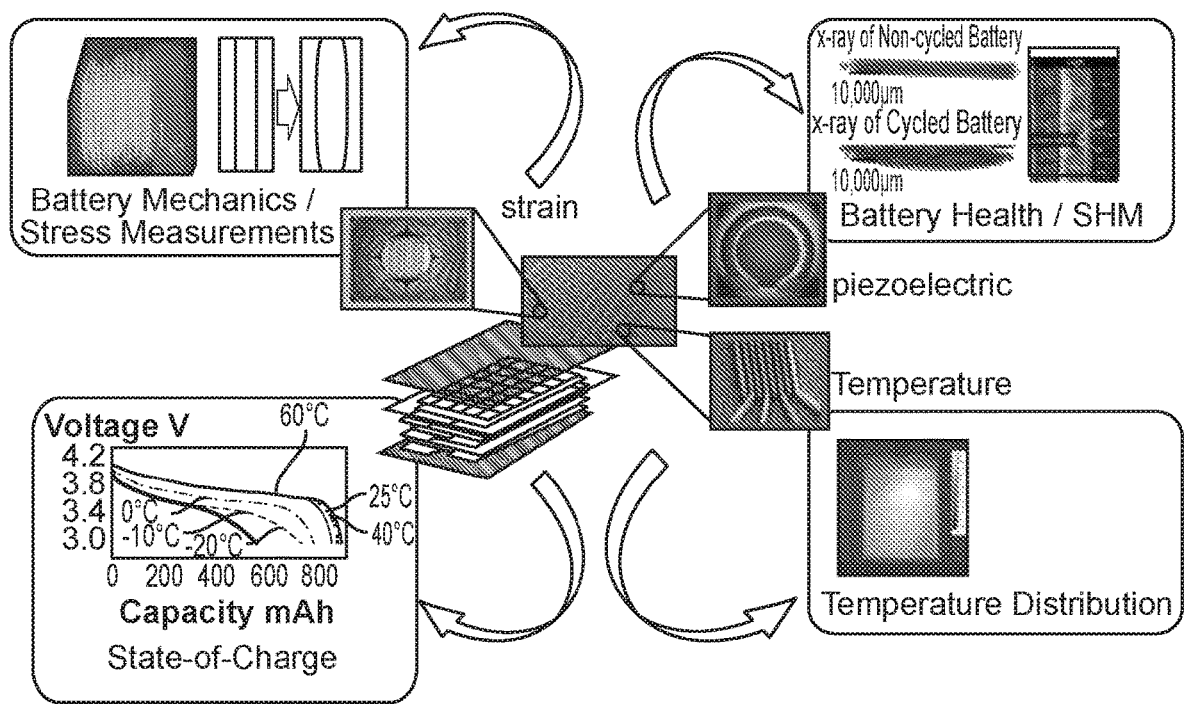
FIG. 12. Battery and structural health monitoring of MES Composites via distributed micro-sensor networks.

Battery and structural health monitoring capabilities are incorporated through in-situ integration of sensor/actuator networks into structural batteries, allowing the collection of insightful data on structural integrity and battery condition and its use to predict the remaining useful life of the structural battery system (FIG. 12). Processing of data from a sensor/actuator network can be carried out by a computing device. Special emphasis is given to this part in this example, showing some results on using Structural Health Monitoring (SHM)-based ultrasonic inspection for battery health prediction, as well as providing a structural and battery health monitoring framework for MES Composites.

Figure 13:
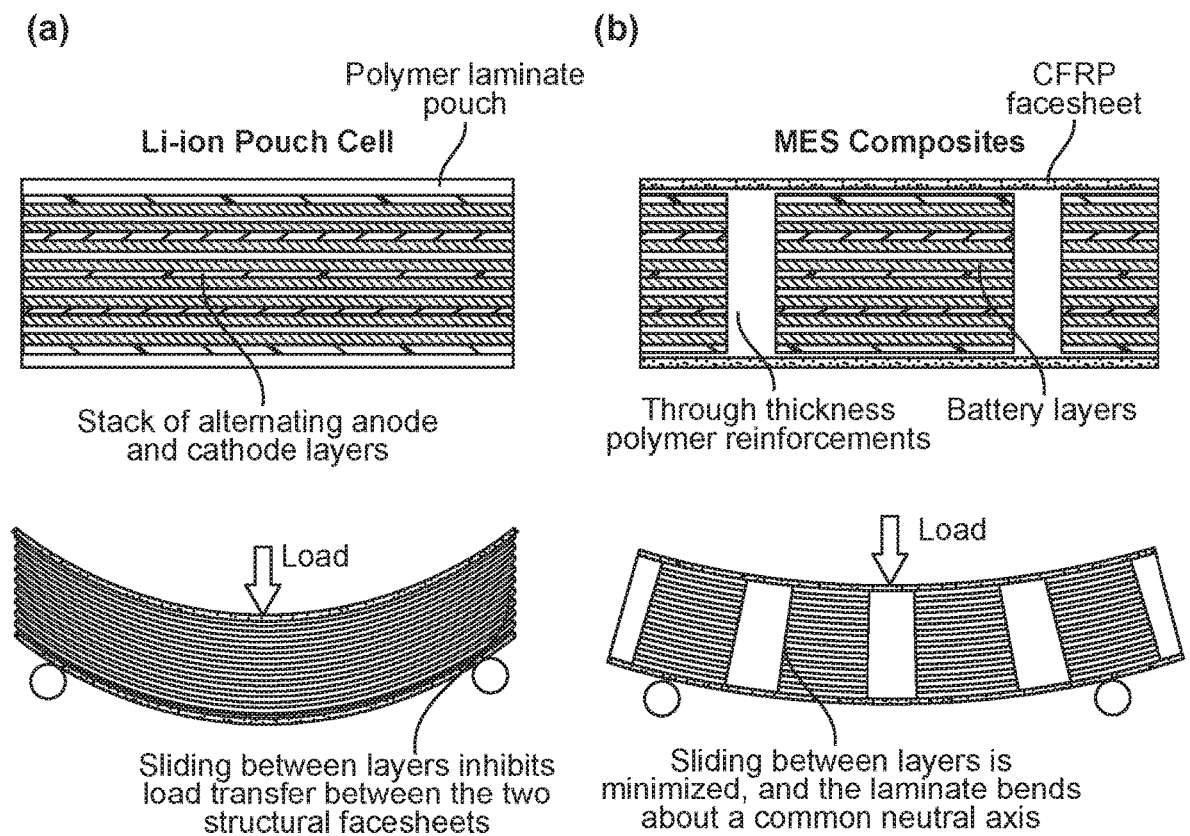
FIG. 13. Comparison between (a) a Li-ion pouch cell and (b) MES Composites.

Vertical Material Integration:

Li-ion pouch cells typically include a stack of alternating anode and cathode layers, separated by thin micro-porous polymer separator membranes (FIG. 13a). Li-ion cells are designed primarily to store energy, and, as a result, their mechanical load carrying capability and load transfer through the cells are reduced. The individual electrode layers are loose, therefore there is little mechanical coupling between the layers. Even a small mechanical load exerted on a battery can thus cause excessive relative layer slipping, resulting in battery degradation or even short-circuiting.

The material integration and functionalization concept for MES Composites is presented (FIG. 13b). MES Composites encapsulate Li-ion battery materials inside structural carbon-fiber-reinforced-polymers (CFRP) facesheets. The stiff structural CFRP facesheets are placed on both sides of an electrode stack, separated by a stack thickness, to carry a majority of a bending moment.

However, without an interlayer shear resistance of a battery core, thin battery layers can bend about their own individual neutral axis, and a structural contribution from the facesheets will be reduced. Therefore, MES Composites employ through-thickness polymer reinforcement pins, which extend through perforations in the electrode stack. The through-thickness reinforcement pins interlock the individual electrode layers, and mechanically link the two structural CFRP facesheets together (FIG. 13b). The interlocking pins allow load transfer between the two facesheets and inhibit the relative slipping between the adjacent electrode layers, allowing the entire laminate to be able to bend about a common neutral axis. This approach significantly increases the stiffness and strength of MES Composites over comparative Li-ion batteries.

Despite the disruptive change in cell construction compared to comparative pouch cells, minimal impact on the electrochemistry and electrochemical performance is achieved. Owing to the interlocking mechanisms, MES Composites show a significant increase in bending stiffness and little or no discernable degradation on the electrochemical performance upon application of quasi-static and even cyclic fatigue loading.

In-Situ Battery and Structural Health Monitoring:

SHM and State-Awareness Demonstration of Sensor-Network-Integrated Systems

In accordance with SHM, a real-time system-wide state-awareness is desired to bridging a link between data from sensors and computational techniques for determining health state and system operation. The system reliability and robustness rely on the capability to deploy a large number of sensors of different types over a large structural area.

The integration of distributed sensing systems with structural elements can allow condition-based maintenance based on SHM, which contributes to enhanced vehicle safety and reliability. Distributed sensors enhance SHM capabilities for damage detection, improving the reliability and accuracy of structural diagnostics and prognostics.

Furthermore, micro-fabricated stretchable sensor networks allow a multitude of small-scale sensors, including wiring, to be fabricated at large scales through microfabrication processes. After fabrication, these networks can be expanded to cover a structural area of a few orders of magnitude larger than an initial fabrication footprint. The small footprint of the sensors allows the networks to be embedded into a host structure with reduced parasitic effects. Myriads of various sensor types tailored for SHM can be included in the sensor networks, including piezoelectric transducers which can be used for ultrasonic damage detection, strain gauges for strain level measurement, temperature sensors for environmental condition monitoring, and so forth.

The introduction of a stretchable sensor network to an autonomous system can lead to improved state awareness, allowing the system to sense its environment, operating condition and structural health state, and allowing the interpretation of sensing data to improve system performance and control characteristics.

Framework for Battery and Structural Health Monitoring of MES Composites Using Distributed Sensor Data Stretchable sensor networks can be integrated into MES Composites and thus provide capability of generating data for structural health estimation. Nevertheless, there are also advantages to simultaneously use the same sensor data for determining the battery charge state as well as the battery health status.

In addition to voltage and current data, the sensor networks can provide additional information about operating conditions and even physical changes in cells during operation, which will be useful for battery SoC and SoH prediction and estimation.

Distributed temperature sensors can be used to measure a temperature distribution, based on which the state-estimation model parameters, such as cell resistance and capacitance, can be updated. The temperature-induced acceleration in aging can also be estimated, even at localized areas of the cell, and used to improve the battery health prediction. The ability to measure the maximum temperature in real-time at discrete locations is also included for safety and prevention of thermal runaway.

Strain gauges can be used to measure stress levels in the cell due to external mechanical loads during operation, and therefore can be used to quantify mechanically-induced degradation of battery performance and preemptively detect non-critical degradation due to mechanical stress.

Piezoelectric transducers can be used in active ultrasonic guided wave-based methods to detect changes in physical properties within battery materials and correlate these changes with the SoC. The changes observed from charge/discharge (electrical) and loading cycles can also provide information in determining mechanical degradation and the battery's SoH.

Figure 14:
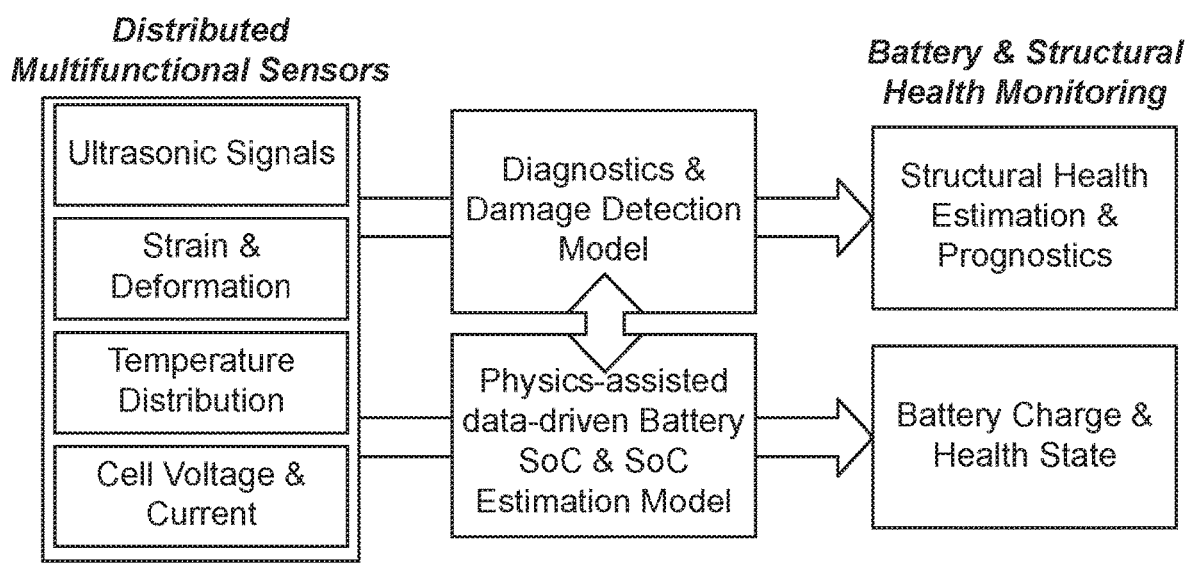
FIG. 14. Framework for battery and structural health monitoring of MES Composites using real-time data from distributed multifunctional sensors.

Using ultrasonic information to correlate with a battery's SoC and SoH is desired. In this example, emphasis is given to results in correlating ultrasonic signature with changes in battery materials, and applications for SoC and SoH determination. This will provide a framework towards the construction of physics-assisted data-driven state-estimation computational techniques for SoC and SoH. Coupled with structural diagnostics and prognostics models, both the battery's SoH and the structural integrity of MES Composites can be simultaneously determined using shared distributed sensor data, as can be summarized by the framework presented in FIG. 14.

Battery Charge and Health Monitoring with Ultrasonic Guided Waves Using Piezoelectric Transducers Comparative approaches in correlating ultrasonic interrogation with a battery's SoC and SoH rely on bulk waves. In these approaches, through-thickness transmitted and reflected waves are used to correlate changes in materials with the charge state and mechanical degradation. However, a drawback is the inclusion of external bulky ultrasonic probes and equipment, extensive human intervention, and difficulty in attaining accurate baseline collection. An advantage of the approach presented in this example lies in the introduction, experimental demonstration, and assessment of using permanently mounted thin piezoelectric disc transducers to generate ultrasonic guided waves (or Lamb waves that propagate in-plane) for on-demand battery SoC and SoH estimation.

With reference to active-sensing guided wave-based SHM, ultrasonic signals are collected in pitch-catch mode, where one transducer acts as an actuator generating guided waves, and arriving waves are measured at other sensing transducers. The piezoelectric signals can provide useful information for estimating a remaining useful life of batteries. The signals collected from fresh batteries can serve as baseline data, to which data from subsequent charge/discharge cycles can be compared. Shifts in guided wave signal features as compared to the baseline data, in combination with voltage and current information, can be used to estimate the battery's SoH.

Variation in Guided Wave Signals with Battery's State of Charge

Experimental Method

An experiment is performed on an about 4000 mAh MES Composite sample (about 160×110×5 mm—the active battery stack is about 90×90×3.5 mm located in the center of the sample). Four about 6.35 mm-diameter disc piezoelectric transducers (PZT-5A) in the SMART Layer format (Acellent Technologies Inc.) are attached on a surface of the battery stack using Hysol E20HP structural epoxy adhesive, according to schematics shown in FIG. 15a.

The piezoelectric transducers are actuated with five-peak Hanning-windowed tone bursts, using a 64-channel ultrasonic data acquisition system (ScanGenie model; Acellent Technologies, Inc.). The peak-to-peak amplitude of actuation signals is about 75 V. The center frequencies of the signals span between about 100 kHz to about 200 kHz, and are selected to obtain clear wave packets in a sensor response. Measurements are taken every about 1 minute for a total duration of about 12 hours.

Electrochemical cycling is performed at a substantially constant temperature (about 23° C.) using an eight-channel battery analyzer (BST8-3, MTI Corporation). The cycling tests are performed at a substantially constant current rate of about 800 mA (about C/5), between about 4.2 V and about 3.0 V. The battery analyzer is time-synchronized with the ultrasonic data acquisition system.

Results and Discussion

Figure 15:
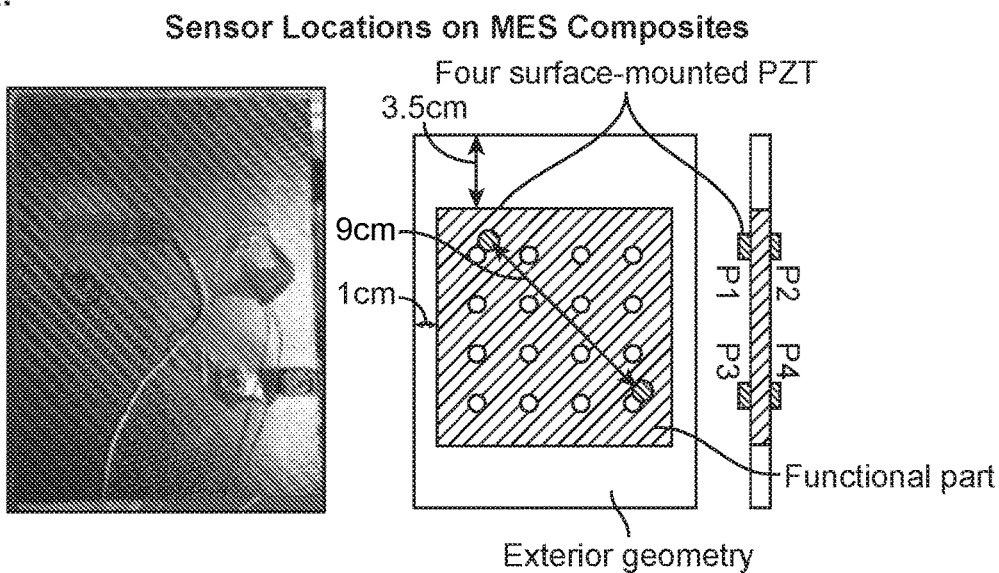
FIG. 15. (a) Locations of piezoelectric transducers on MES Composite cell; (b) time-domain signals from a P1-P3 transducer pair at two different SoC during discharging (actuation scaled to 1 Vpp for plot); and (c) cell voltage and signal features during charge/discharge cycle.
Figure 15:
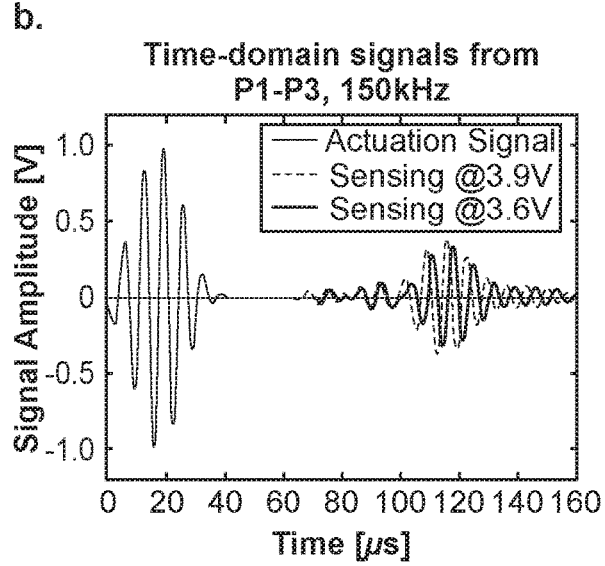
Figure 15:
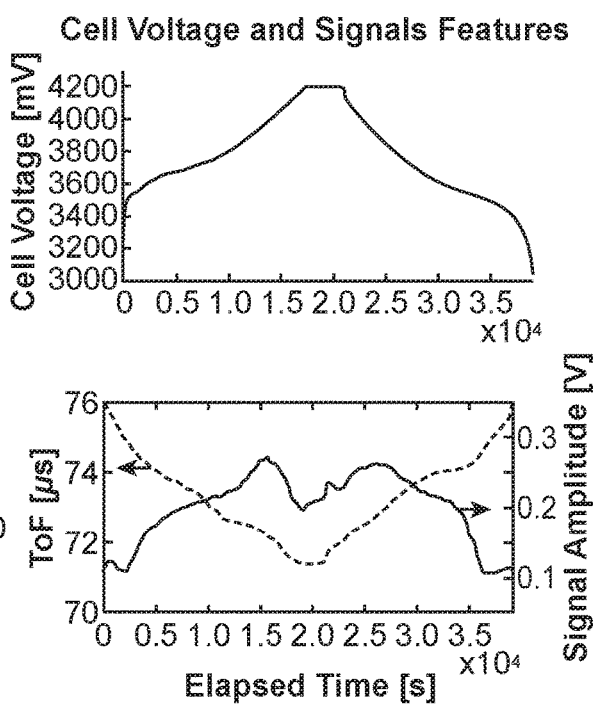

FIG. 15b shows representative piezoelectric sensor signals at two different SoC (at a terminal voltage of about 3.9 V and about 3.6 V), obtained during the discharge phase. The signals shown are collected from a P1-P3 transducer pair with a center frequency of about 150 kHz. The time of flight (ToF) and signal amplitude are extracted from the signals throughout the cycle and plotted in FIG. 15c. The signal amplitude is specified as the maximum amplitude of the signal envelope (Hilbert transform of the sensing signals). The ToF refers to the time between the maximum amplitude of the actuation (pitch) and response (catch) signals.

As the battery is charged, the signal amplitude slightly decreases, followed by a gradual increase until the cell potential of about 4.05 V is reached. Near the end of the discharge, the signal amplitude decreases again (see FIG. 15c). As the charge current is removed, the signal amplitude relaxes gradually to an equilibrium value. During the discharge process, the signal amplitude fluctuates slightly at the beginning of the discharge (< about 3.8 V), followed by a gradual decrease except for the region near the end of discharge when the cell potential is less than about 3.5 V. Signal attenuation is found to be generally decreasing during discharge and increasing during charge, with exception regions near the beginning and end of the charge and discharge phases. During these exception regions, it is hypothesized that a phase transformation in a cathode overshadows a global effect from a graphitic anode. During charging, the ToF of the first wave packet generally decreases in a monotonic fashion. As the battery is discharged, the ToF increases monotonically until the minimum cut-off voltage.

It can be seen that there is a strong correlation between the signal features of ultrasonic guided waves and the battery's SoC. Changes in the SoC of the battery are reflected in changes in the density and elastic modulus of the anode and cathode materials, which in turn affect the behavior of the guided waves. Moreover, variations in the slopes of the signal amplitude and ToF versus time can be seen at different instances throughout the charge and discharge processes. Besides the effect from the cathode phase transition, these non-linearities can be primarily induced by the intercalation staging in the graphitic anode.

Particularly for Li-ion batteries and MES Composites, a propagation substrate is mixed-media, with high anisotropy and inhomogeneity. A charge/discharge rate can also affect a rate at which the modulus and density change, as well as an acousto-elastic effect from a film stress developed from intercalation or phase change of active materials. Therefore, an analytical relationship between the material property distribution and the resulting signal attenuation and wave velocity is not trivial. Numerical techniques for guided wave propagation can be used to simulate the changes in waveforms due to the changes in material properties.

Deviation from Ultrasonic Baseline Signals in Aged Li-Ion Batteries

Experimental Method

Figure 16:
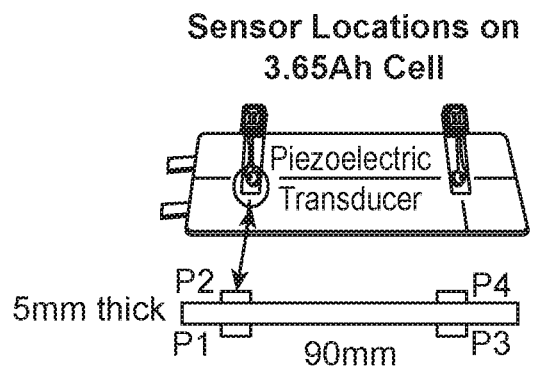
FIG. 16. Results from accelerated aging: (a) locations of piezoelectric transducers on a battery cell; (b) capacity retention plot, showing capacity retention at cycles 1, 25, and 50; and (c) corresponding cyclic ultrasonic features at cycles 1, 25 and 50.
Figure 16:
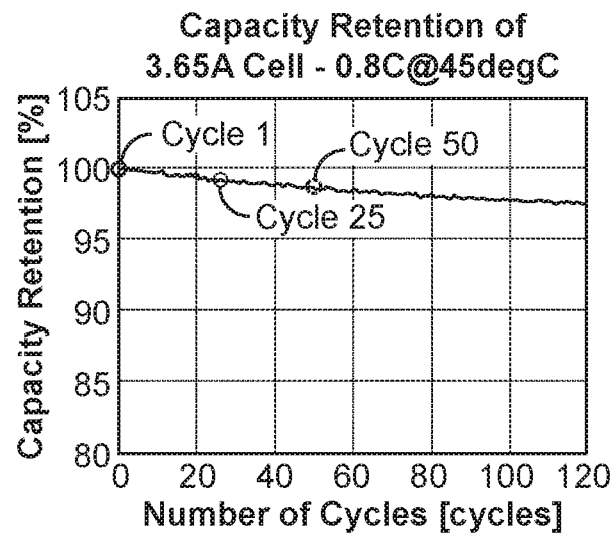
Figure 16:
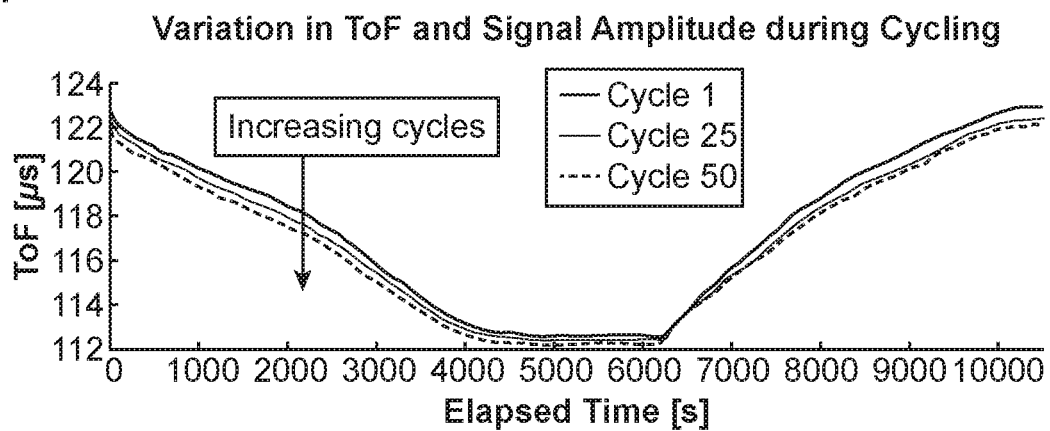
Figure 16:
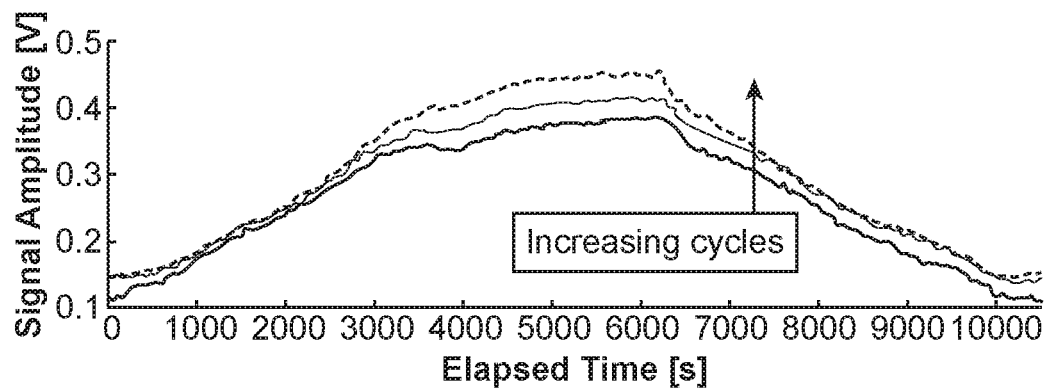

An accelerated aging experiment is performed on production Li-ion pouch batteries, where ultrasonic signals are collected and analyzed. The samples are about 3650 mAh Li-ion pouch cells (about 135×45×5 mm)—similarly, with four surface-mounted PZT-5A SMART layers (FIG. 16a). The ultrasonic data collection is similarly performed as previously described. The cells are cycled at an elevated temperature of about 45° C. The cycling is carried out at a higher current rate to accelerate the electrochemical degradation. The charge/discharge current is about 3000 mA (about 0.8 C), between about 4.2 V and about 2.75 V. A constant-current-constant-voltage (CCCV) profile is used for the charging phase, with a cutoff current of about 182.5 mA (about C/20).

Results and Discussion

The capacity retention with the number of charge/discharge cycles is shown in FIG. 16b, with the values normalized with respect to the first cycle capacity. The accelerated capacity fading of the cell is about 0.25%/10 cycles. At Cycle 25 and Cycle 50, the capacity of the cell is at about 99.2% and about 98.6% of the first cycle, respectively.

The ToF and signal amplitude variation during Cycles 1, 25 and 50 is shown in FIG. 16c. As can be seen, the cyclic ToF and signal amplitude of Cycle 25 deviate quite significantly from those of Cycle 1, which correspond to baseline signals. The deviation at Cycle 50 is even more prominent, after the battery ages for another 25 cycles. As a general observation, the ToF overall appears to shift to a lower value as the battery ages, namely the wave speed is faster. This is accompanied by an overall higher signal amplitude as the electrical degradation progresses.

Such degradation-induced variation in the signal features provides useful information for estimating a remaining useful life of a battery. As mentioned previously, the cyclic signature in the ToF and signal amplitude data is mainly due to the distribution and redistribution of the material properties, mainly the modulus and density. Physical insights into the electrically-induced mechanical degradation can be used to construct a physics-based relationship, which correlates the electrical degradation to the varying ultrasonic signature. Therefore, instead of relying on a pure data-driven model, a physics-assisted model can be used in combination with a machine learning-based data-driven state-estimation computation technique for accurately predicting the battery's SoC and SoH.

Conclusions:

This example has presented the concept and characterization results of MES Composites and the incorporation of in-situ sensing for battery and structural health monitoring applications. The results have demonstrated the following features:

Vertical material integration allows MES Composites to concurrently store electrical energy and serve as structural elements to carry mechanical loads in static and dynamic environments. Interlocking pins inhibit deformation inside Li-ion battery electrodes, thus mitigating against degradation on electrochemical performance from mechanical loading.

The feasibility of incorporating embeddable networks of micro-sensors/actuators into MES Composites for structural and battery health monitoring has been illustrated. Various sensors can be used for sensing physical changes in a battery during electrical cycling. Guided wave-based ultrasound techniques using piezoelectric transducers can improve the accuracy of battery SoC estimation, and SoH identification.

As used herein, the singular terms "a," "an," and "the" may include plural referents unless the context clearly dictates otherwise. Thus, for example, reference to an object may include multiple objects unless the context clearly dictates otherwise.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can encompass a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can encompass a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Some embodiments of this disclosure relate to a non-transitory computer-readable storage medium having computer code or instructions thereon for performing various computer-implemented operations. The term "computer-readable storage medium" is used to include any medium that is capable of storing or encoding a sequence of instructions or computer code for performing the operations, methodologies, and techniques described herein. The media and computer code may be those specially designed and constructed for the purposes of the embodiments of this disclosure, or may be of the kind available to those having skill in the computer software arts. Examples of computer-readable storage media include, but are not limited to: magnetic media such as hard disks, floppy disks, and magnetic tape; optical media such as CD-ROMs and holographic devices; magneto-optical media such as optical disks; and hardware devices that are specially configured to store and execute program code, such as application-specific integrated circuits (ASICs), programmable logic devices (PLDs), and ready-only memory (ROM) and random-access memory (RAM) devices. Examples of computer code include machine code, such as produced by a compiler, and files containing higher-level code that are executed by a processor using an interpreter or a compiler. For example, an embodiment of the disclosure may be implemented using Java, C++, or other object-oriented programming language and development tools. Additional examples of computer code include encrypted code and compressed code. Moreover, an embodiment of the disclosure may be downloaded as a computer program product, which may be transferred from a remote computer (e.g., a server computing device) to a requesting computer (e.g., a client computing device or a different server computing device) via a transmission channel. Another embodiment of the disclosure may be implemented in hardwired circuitry in place of, or in combination with, processor-executable software instructions.

While this disclosure has been described with reference to the specific embodiments thereof, it should be understood by those skilled in the art that various changes may be made and equivalents may be substituted without departing from the true spirit and scope of this disclosure as defined by the appended claims. In addition, many modifications may be made to adapt a particular situation, material, composition of matter, method, operation or operations, to the objective, spirit and scope of this disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of this disclosure. Accordingly, unless specifically indicated herein, the order and grouping of the operations are not a limitation of this disclosure.

What is claimed is:

1. A method of battery state monitoring, comprising:
providing a battery cell having a plurality of anodes and a plurality of cathodes;
generating a guided wave that propagates in-plane of the battery cell;
receiving the guided wave as an arriving wave; and
determining a state of the battery cell by analyzing one or more parameters of the arriving wave,
wherein the battery cell comprises a major surface, a second surface opposite the major surface and a thickness direction between the major surface and the second surface, and wherein the anodes and cathodes are stacked in alternating manner in the thickness direction, and wherein generating the guided wave that propagates in-plane of the battery cell includes causing the guided wave to propagate along the major surface of the battery cell in a direction that is substantially parallel to the major surface, and wherein receiving the arriving wave includes receiving the arriving wave along the major surface from the direction that is substantially parallel to the major surface.

2. The method of claim 1, wherein determining the state of the battery cell includes determining a state of charge of the battery cell.

3. The method of claim 1, wherein determining the state of the battery cell includes determining a state of health of the battery cell.

4. The method of claim 1, wherein determining the state of the battery cell includes determining an internal physical condition of the battery cell.

5. The method of claim 1, wherein determining the state of the battery cell is based on an amplitude of the arriving wave.

6. The method of claim 1, wherein determining the state of the battery cell is based on a time of flight of the arriving wave.

7. The method of claim 1, wherein determining the state of the battery cell includes deriving a time-domain or frequency-domain signal parameter of the arriving wave, and comparing the signal parameter with a corresponding reference value.

8. The method of claim 1, wherein determining the state of the battery cell includes determining a spatial distribution of a state of charge or a state of health within the battery cell.

9. The method of claim 1, wherein the guided wave has a center frequency in a range from about 100 kHz to about 2 MHz.

10. The method of claim 1, further comprising providing an ultrasonic transducer mounted on the major surface of the battery cell, wherein generating the guided wave and receiving the arriving wave are using the same ultrasonic transducer, and the arriving wave is a reflected wave corresponding to the guided wave.

11. A method, comprising:
providing a battery cell;
generating a guided wave that propagates in-plane of the battery cell;
receiving the guided wave as an arriving wave;
determining a state of the battery cell based on the arriving wave by analyzing one or more parameters of the arriving wave,
wherein the battery cell comprises a major surface, a second surface opposite the major surface and a thickness direction between the major surface and the second surface, and wherein generating the guided wave that propagates in-plane of the battery cell includes causing the guided wave to propagate along the major surface of the battery cell in a direction that is substantially parallel to the major surface, and wherein receiving the arriving wave includes receiving the arriving wave along the major surface from the direction that is substantially parallel to the major surface; and
providing at least one ultrasonic actuator mounted on at least the major surface of the battery cell and at least one ultrasonic sensor mounted on at least the major surface of the battery cell, wherein generating the guided wave is using the ultrasonic actuator, and receiving the arriving wave is using the ultrasonic sensor.

12. The method of claim 11, wherein the ultrasonic actuator and the ultrasonic sensor are a first ultrasonic transducer and a second ultrasonic transducer, respectively, and the guided wave and the arriving wave are a first guided wave and a first arriving wave, respectively.

13. The method of claim 12, further comprising:
using the second ultrasonic transducer, generating a second guided wave that propagates in-plane of the battery cell along the major surface from the direction that is substantially parallel to the major surface of the battery cell and substantially perpendicular to the thickness direction; and
using the first ultrasonic transducer, receiving the guided wave as a second arriving wave.

14. The method of claim 11, wherein the ultrasonic actuator is a laser source, an ablative source, or a thermoelastic source.

15. A battery comprising:
a battery cell including a plurality of anodes and a plurality of cathodes;
a set of one or more ultrasonic transducers mounted to the battery cell; and
a controller configured to direct a first one of the set of ultrasonic transducers to generate a guided wave that propagates in-plane of the battery cell and is received as an arriving wave at another one of the set of ultrasonic transducers,
wherein the battery cell comprises a major surface, a second surface opposite the major surface and a thickness direction between the major surface and the second surface, wherein the anodes and cathodes are stacked in alternating manner in the thickness direction, and wherein generating the guided wave that propagates in-plane of the battery cell includes causing the guided wave to propagate along the major surface of the battery cell in a direction that is substantially parallel to the major surface, and wherein receiving the arriving wave includes receiving the arriving wave along the major surface from the direction that is substantially parallel to the major surface.

16. The battery of claim 15, wherein the ultrasonic actuator and the ultrasonic sensor are a first ultrasonic transducer and a second ultrasonic transducer, respectively, and the guided wave and the arriving wave are a first guided wave and a first arriving wave, respectively.

17. The battery of claim 15, wherein the controller is configured to direct the first one of the set of ultrasonic transducers to receive the arriving wave corresponding to the guided wave.

18. The battery of claim 16 or 17, wherein the controller is configured to derive a time-domain or frequency-domain signal parameter of the arriving wave, and compare the signal parameter with a corresponding reference value.

19. The battery of claim 15, further comprising an enclosure, wherein the set of ultrasonic transducers are disposed within the enclosure.

\* \* \* \* \*